(12) United States Patent  
Bale

(10) Patent No.: US 9,358,850 B1
(45) Date of Patent: Jun. 7, 2016

(54) SECURITY DEVICE FOR A COUPLER OF A TRAILER

(71) Applicant: Bruce H. Bale, Eugene, OR (US)

(72) Inventor: Bruce H. Bale, Eugene, OR (US)

( * ) Notice: Subject to any disclaimer, the term of this patent is extended or adjusted under 35 U.S.C. 154(b) by 186 days.

(21) Appl. No.: 14/042,649

(22) Filed: Sep. 30, 2013

(51) Int. Cl.
*B60D 1/60* (2006.01)

(52) U.S. Cl.
CPC ........................................ *B60D 1/60* (2013.01)

(58) Field of Classification Search
CPC ........................................................ B60D 1/60
USPC ................... 280/507; 70/2, 6, 7, 8, 54, 55, 56
See application file for complete search history.

(56) References Cited

U.S. PATENT DOCUMENTS

| | | | |
|---|---|---|---|
| 3,857,575 A | 12/1974 | Lee | |
| 3,924,878 A * | 12/1975 | Utman et al. | 280/507 |
| 4,032,171 A | 6/1977 | Allen et al. | |
| 4,141,569 A | 2/1979 | Dilk | |
| 4,373,303 A | 2/1983 | Stratichuk | |
| 4,459,832 A | 7/1984 | Avrea et al. | |
| 4,538,827 A | 9/1985 | Plifka | |
| 4,571,964 A * | 2/1986 | Bratzler | 70/58 |
| 4,577,884 A | 3/1986 | Harris | |
| 4,648,618 A * | 3/1987 | Utman et al. | 280/507 |
| 4,730,841 A | 3/1988 | Ponder | |
| 4,756,172 A | 7/1988 | Weaver | |
| 4,774,823 A | 10/1988 | Callison | |
| 4,836,570 A | 6/1989 | Lopez et al. | |
| 5,087,064 A | 2/1992 | Guhlin | |
| 5,094,423 A | 3/1992 | Almquist et al. | |
| 5,195,339 A | 3/1993 | Nee et al. | |
| 5,351,511 A | 10/1994 | Bernier | |
| 5,584,495 A | 12/1996 | Mason | |
| 5,681,053 A * | 10/1997 | Misukanis et al. | 280/507 |
| 5,700,024 A | 12/1997 | Upchurch | |
| 5,775,139 A | 7/1998 | Sellers | |
| 5,873,271 A | 2/1999 | Smith | |
| 6,070,441 A | 6/2000 | Bernstrom | |
| 6,202,453 B1 * | 3/2001 | Disher et al. | 70/14 |
| 6,244,614 B1 * | 6/2001 | Bonvillain et al. | 280/507 |
| 6,406,052 B1 | 6/2002 | Bale | |
| 6,588,239 B1 | 7/2003 | Johanssen | |
| 7,107,799 B1 | 9/2006 | Marley et al. | |
| 7,300,068 B1 * | 11/2007 | Johnsen | 280/507 |
| 8,556,288 B1 | 10/2013 | Bale | |
| 2006/0181060 A1 * | 8/2006 | Bussiere et al. | 280/507 |
| 2008/0067783 A1 * | 3/2008 | Rousseau | 280/507 |
| 2009/0102159 A1 * | 4/2009 | Van Laere | 280/507 |

FOREIGN PATENT DOCUMENTS

GB          2126549 A        3/1984

* cited by examiner

*Primary Examiner* — Joseph Rocca
*Assistant Examiner* — Conan Duda
(74) *Attorney, Agent, or Firm* — David S. Alavi

(57) ABSTRACT

A security device for a coupler for a trailer includes a bracket, a clamp lever cover, and a cover lock. The bracket is connected to the coupler, which includes a socket, a ball clamp, and a clamp lever. The clamp lever cover is engaged with the bracket and, in a secured arrangement, prevents movement of the clamp lever, thereby holding the ball clamp in a clamped arrangement, in turn retaining a hitch ball within the socket or preventing insertion of a hitch ball into the socket; in an unsecured arrangement the cover permits movement of the clamp lever from the engaged structural arrangement to the disengaged structural arrangement, thereby releasing the hitch ball or permitting insertion of a hitch ball. When unlocked the cover lock permits movement of the clamp lever cover to the unsecured arrangement; when locked retains the clamp lever cover in the secured arrangement.

23 Claims, 22 Drawing Sheets

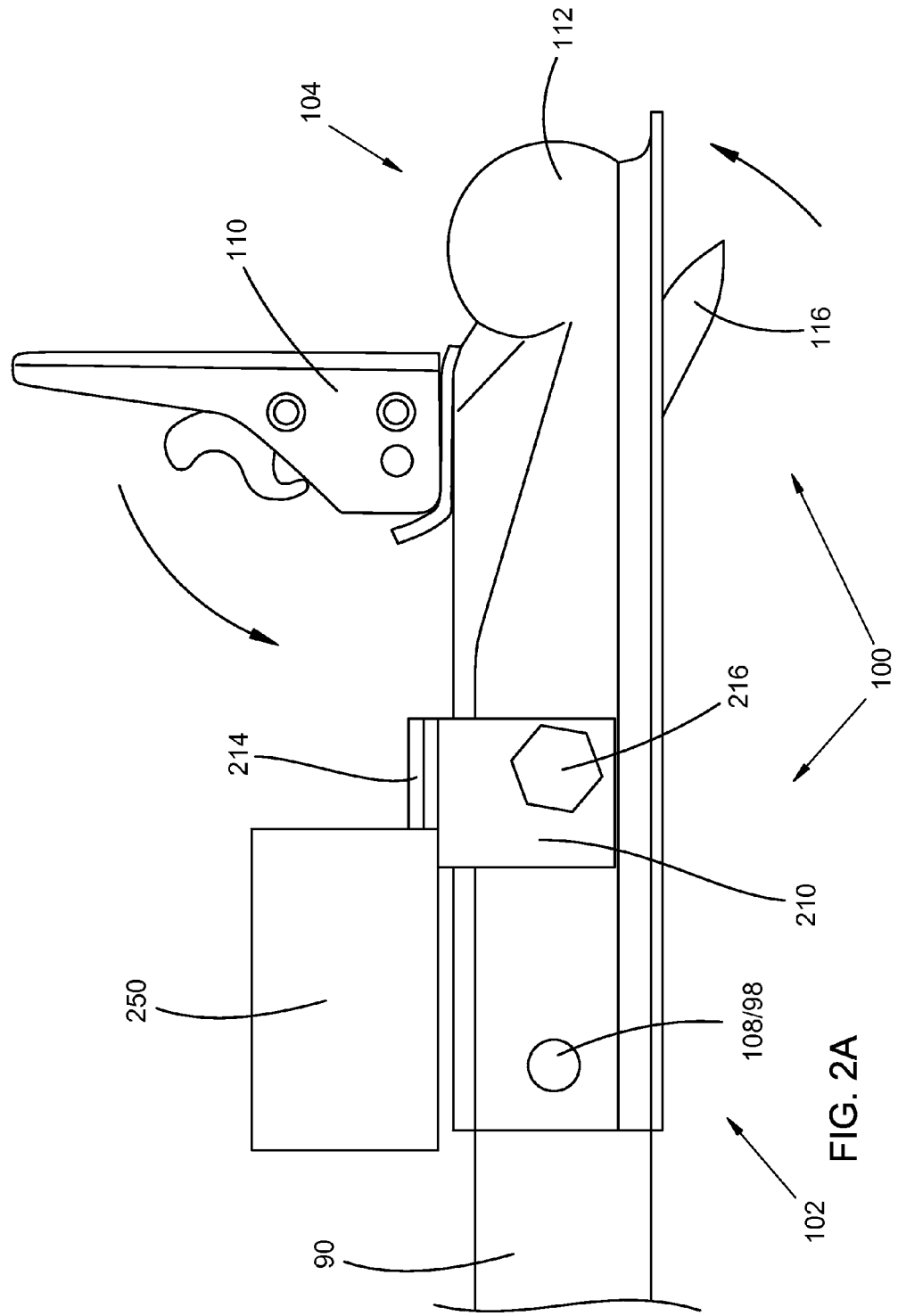

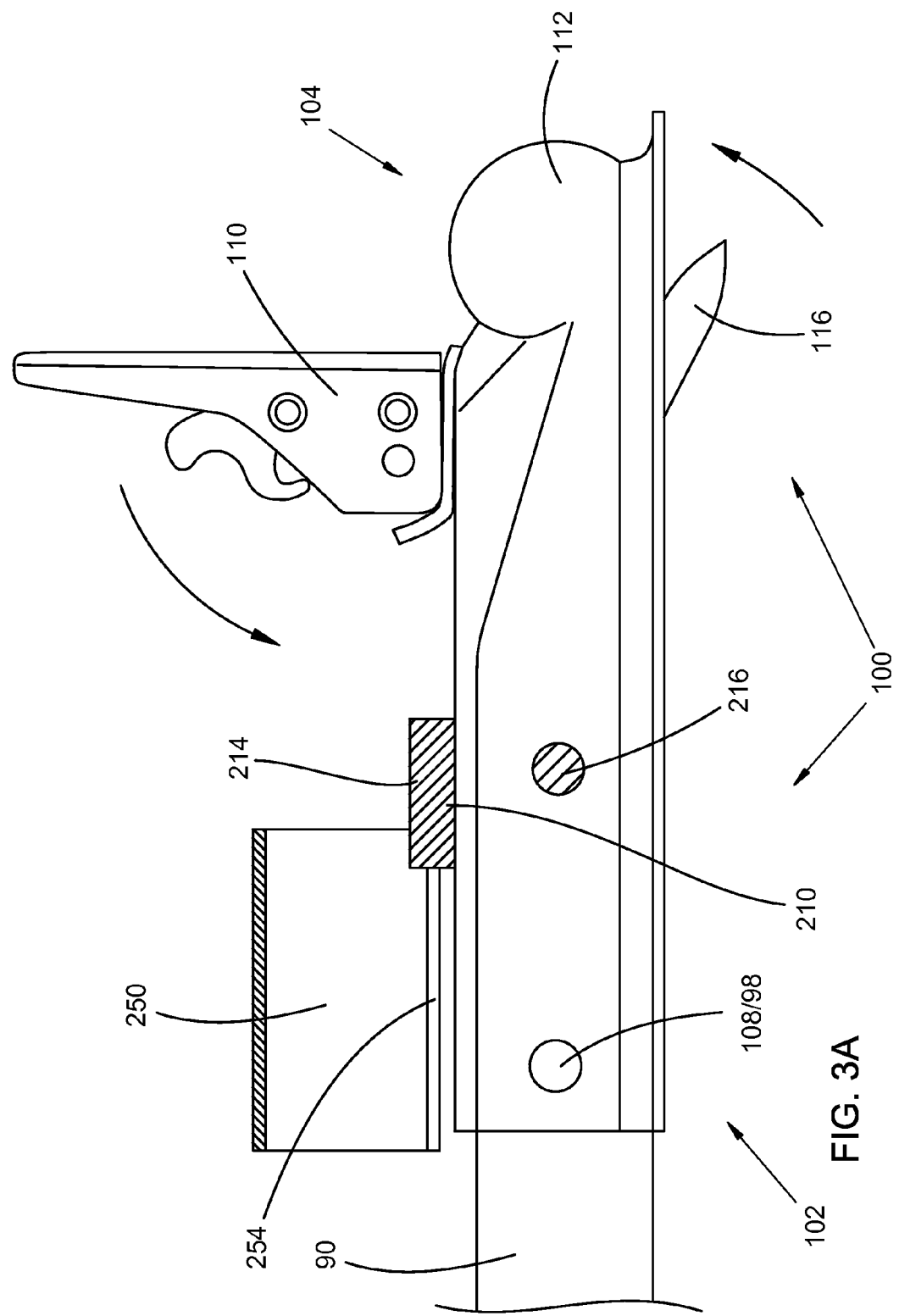

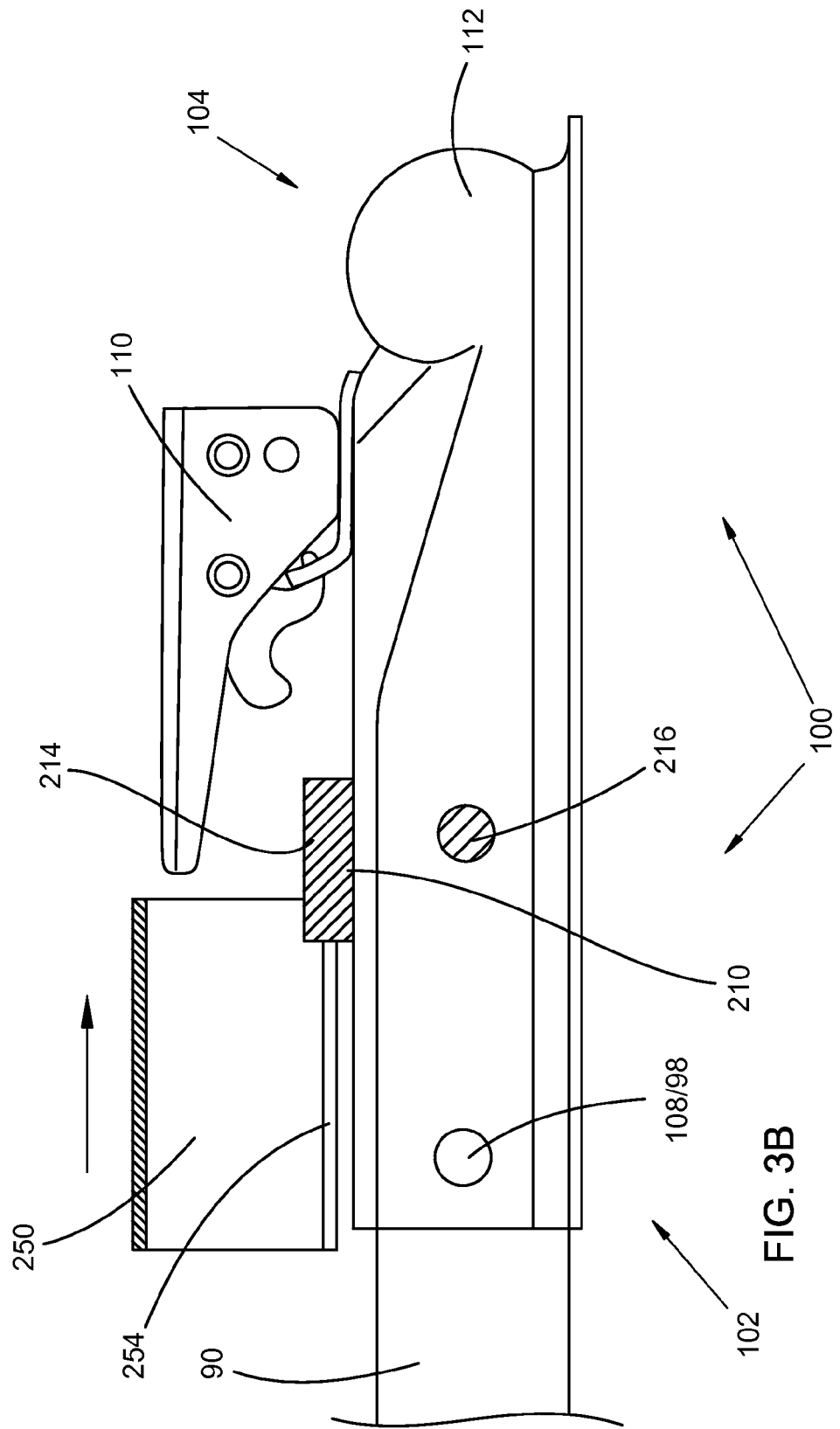

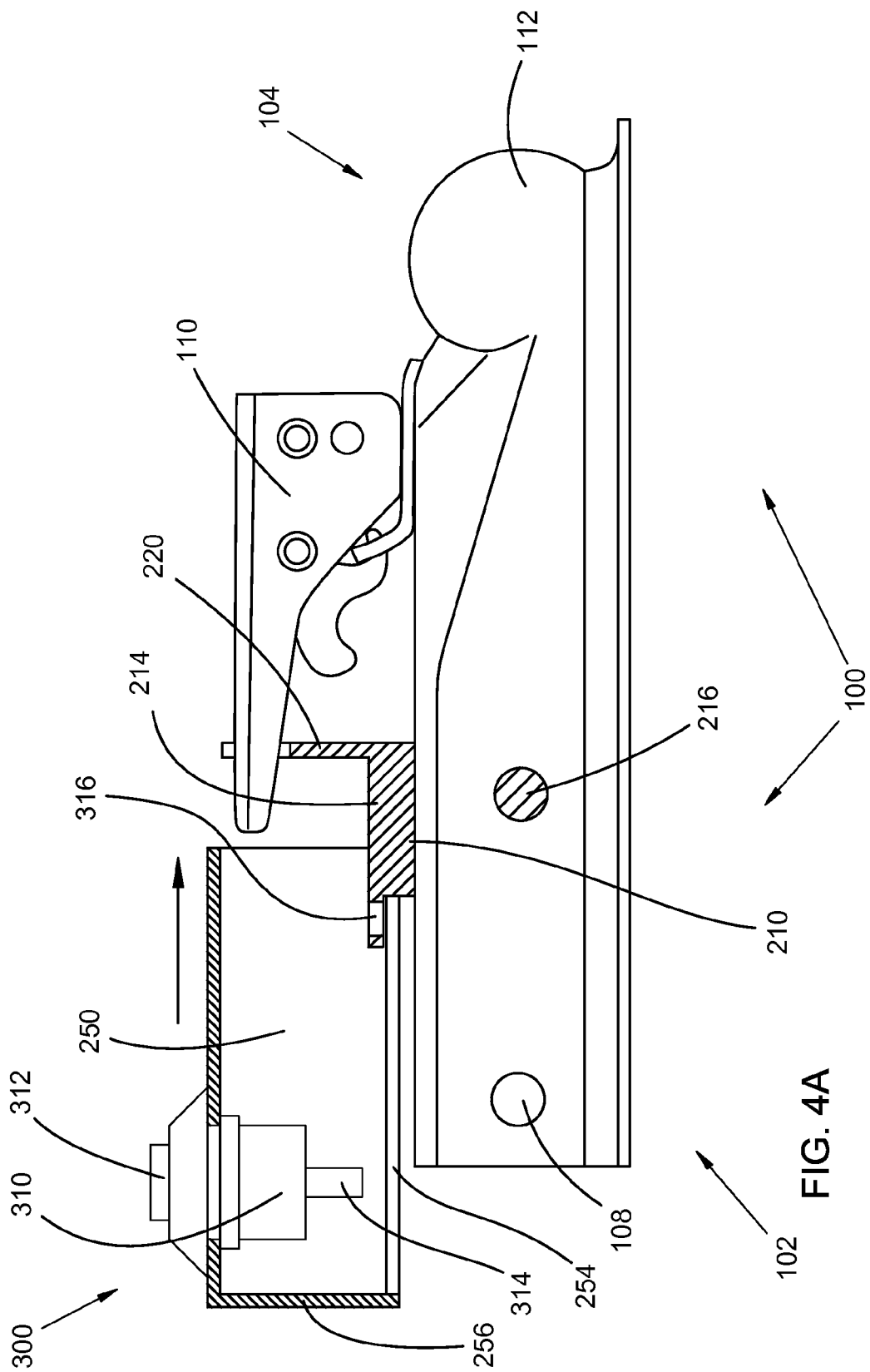

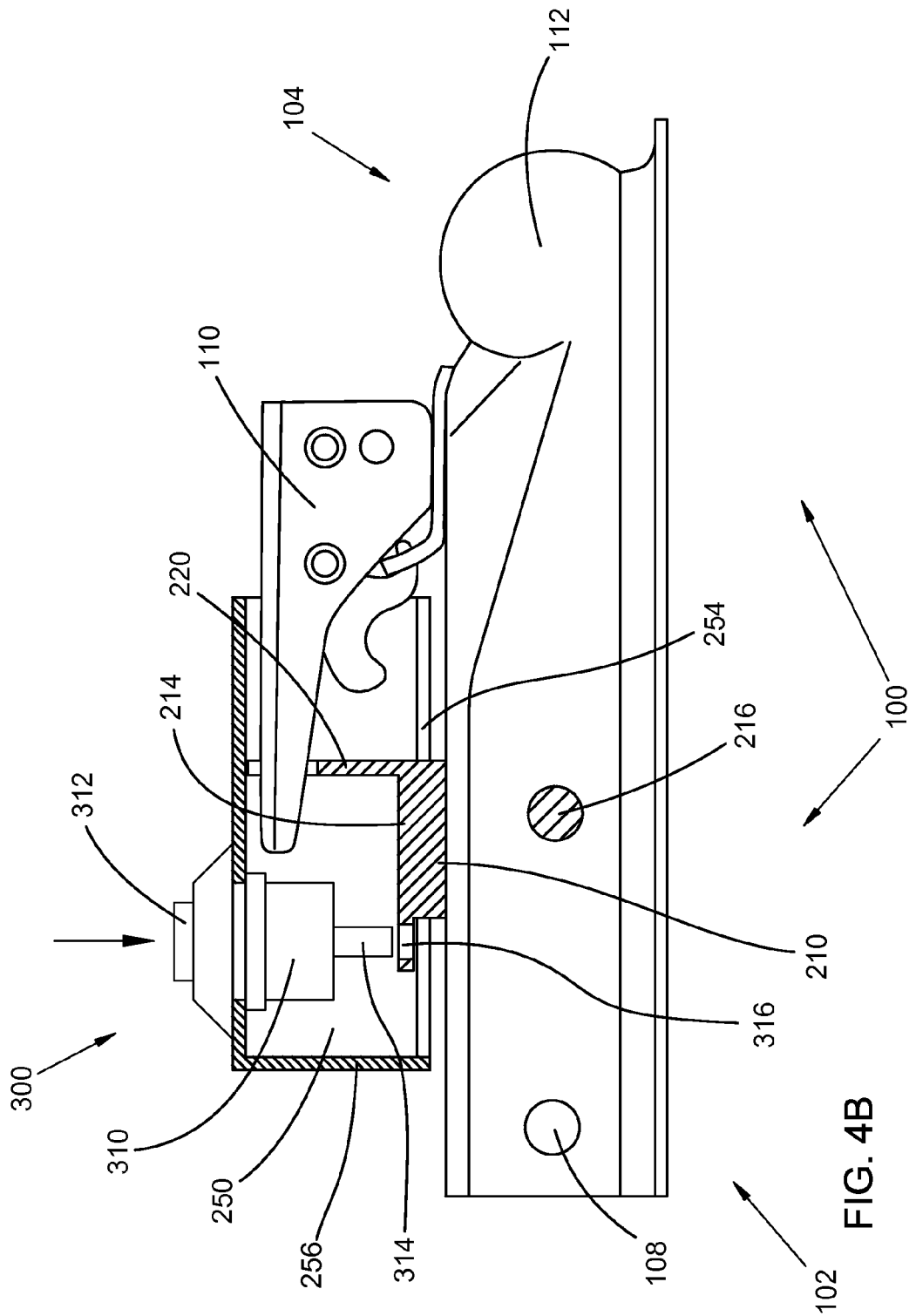

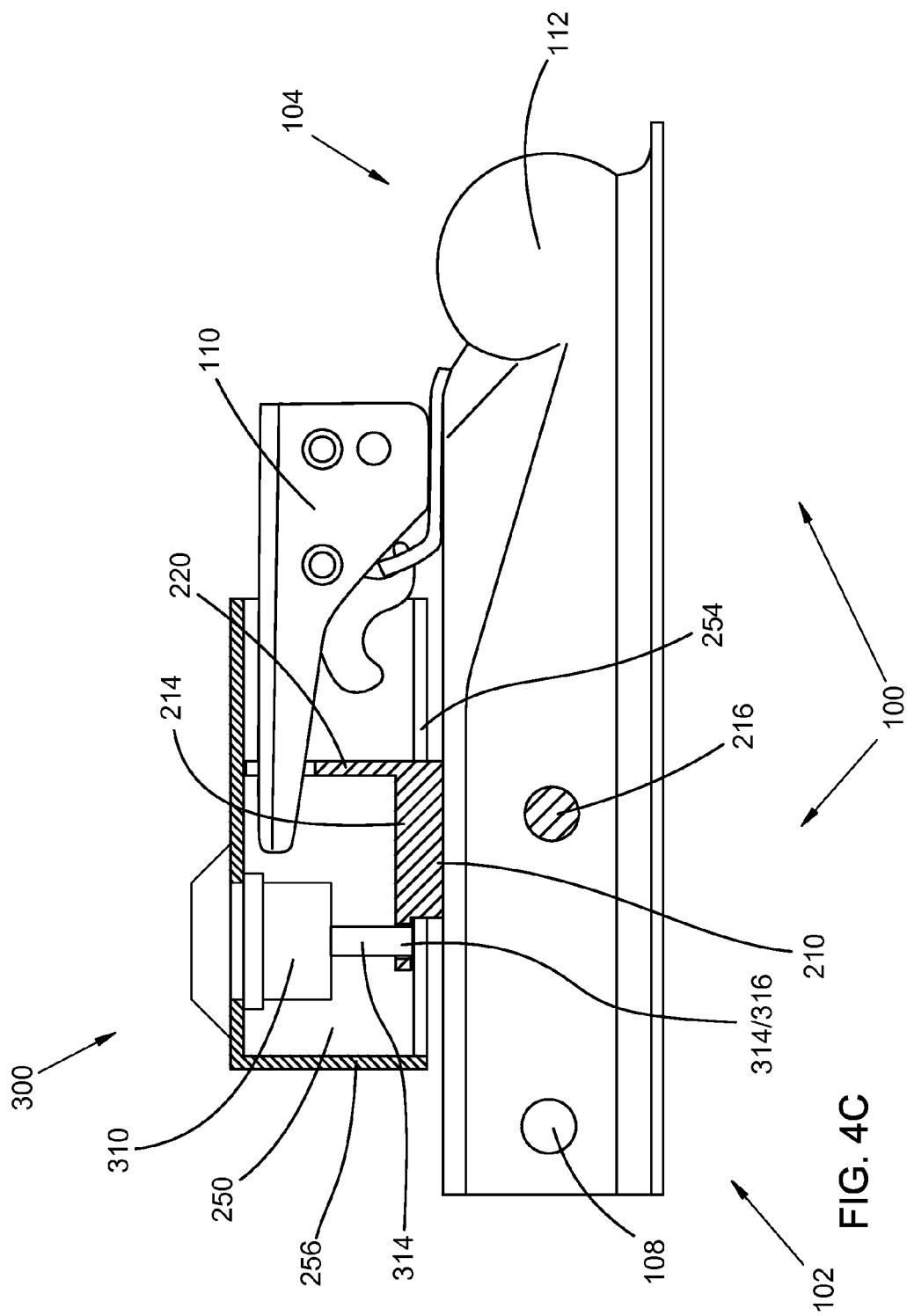

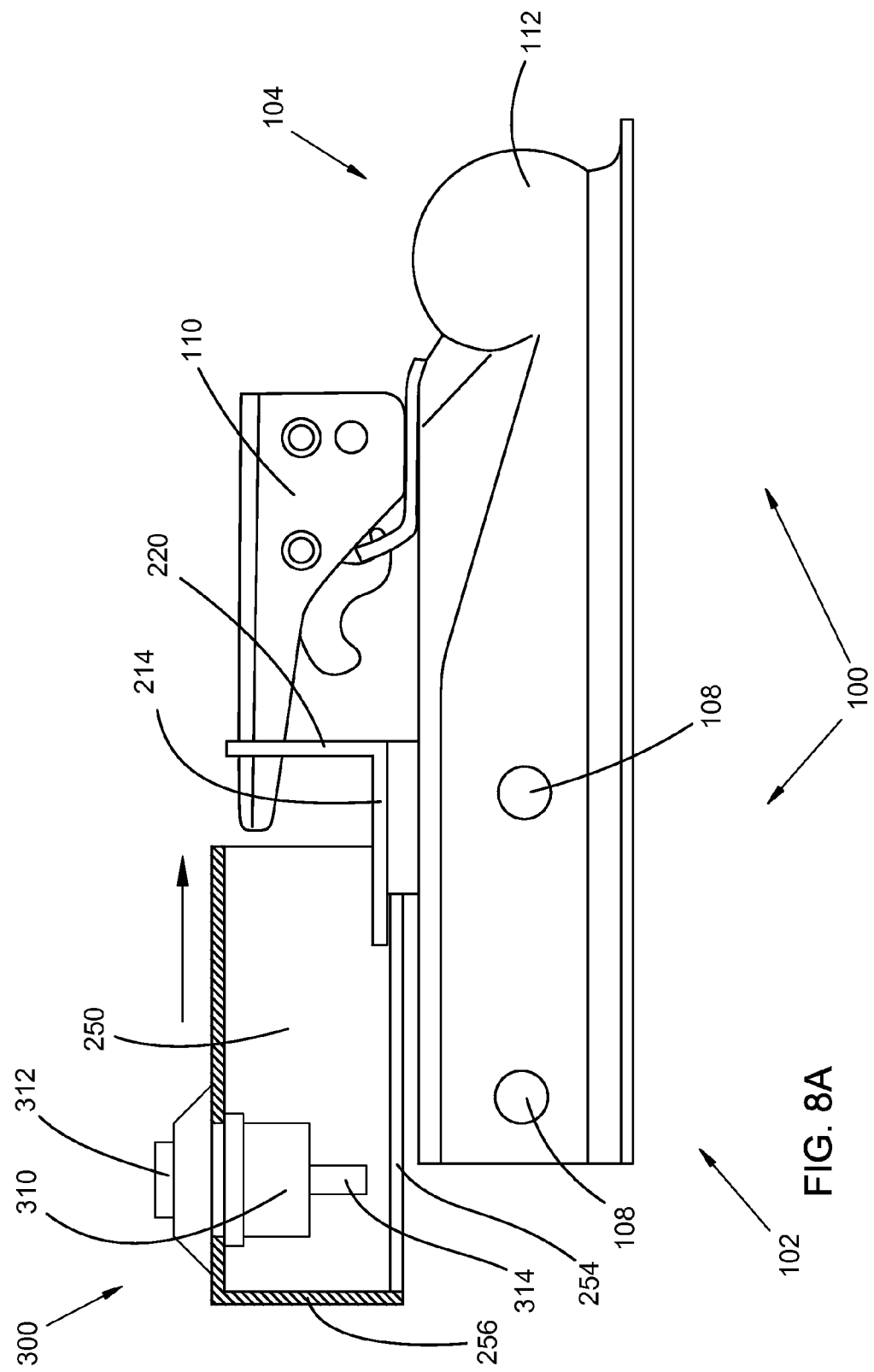

SECURITY DEVICE FOR A COUPLER OF A TRAILER

BACKGROUND

The field of the present invention relates to trailer hitches. In particular, a security device is shown and described herein for securing a coupler of a trailer.

A wide variety of hitching post and security devices are available for trailer couplers or hitches. Some of these are described in, e.g.:

- U.S. Pat. No. 3,857,575 entitled "Security trailer hitching post" issued Dec. 31, 1974 to Lee;
- U.S. Pat. No. 4,032,171 entitled "Trailer hitch locking device" issued Jun. 28, 1977 to Allen et al;
- U.S. Pat. No. 4,141,569 entitled "Theft prevention device" issued Feb. 27, 1979 to Dilk;
- U.S. Pat. No. 4,373,303 entitled "In-ground trailer post assembly" issued Feb. 15, 1983 to Stratichuk;
- U.S. Pat. No. 4,459,832 entitled "Trailer hitch lock" issued Jul. 17, 1984 to Avrea et al;
- U.S. Pat. No. 4,538,827 entitled "Ball hitch trailer lock" issued Sep. 3, 1985 to Plifka;
- U.S. Pat. No. 4,577,884 entitled "Trailer hitch" issued Mar. 25, 1986 to Harris;
- U.S. Pat. No. 4,730,841 entitled "Trailer hitch locking device" issued Mar. 15, 1988 to Ponder;
- U.S. Pat. No. 4,756,172 entitled "Trailer lock" issued Jul. 12, 1988 to Weaver;
- U.S. Pat. No. 4,774,823 entitled "Trailer hitch lock" issued Oct. 4, 1988 to Callison;
- U.S. Pat. No. 4,836,570 entitled "Trailer hitch" issued Jun. 6, 1989 to Lopez et al;
- U.S. Pat. No. 5,087,064 entitled "Anti-theft and safety device for a ball and socket trailer hitch" issued Feb. 11, 1992 to Guhlin;
- U.S. Pat. No. 5,094,423 entitled "Trailer security device and method" issued Mar. 10, 1992 to Almquist et al;
- U.S. Pat. No. 5,195,339 entitled "Security device for a trailer hitch or similar article" issued Mar. 23, 1993 to Nee et al;
- U.S. Pat. No. 5,351,511 entitled "Trailer kingpin locking device" issued Oct. 4, 1994 to Bernier;
- U.S. Pat. No. 5,584,495 entitled "Trailer hitch locking assembly" issued Dec. 17, 1996 to Mason;
- U.S. Pat. No. 5,700,024 entitled "Coupler locking device and method" issued Dec. 23, 1997 to Upchurch;
- U.S. Pat. No. 5,775,139 entitled "Trailer hitch lock" issued Jul. 7, 1998 to Sellers;
- U.S. Pat. No. 5,873,271 entitled "Trailer vehicle security device" issued Feb. 23, 1999 to Smith;
- U.S. Pat. No. 6,070,441 entitled "Trailer hitch security device" issued Jun. 6, 2000 to Bernstrom;
- U.S. Pat. No. 6,406,052 entitled "Secure trailer hitching post" issued Jun. 18, 2002 to Bale;
- U.S. Pat. No. 6,588,239 entitled "Locking device" issued Jul. 8, 2003 to Johansson;
- U.S. Pat. No. 7,107,799 entitled "Ball hitch locking device" issued Sep. 19, 2006 to Marley et al; and
- GB 2 126 549 entitled "Trailer security device" published Mar. 28, 1984 in the name of Roberts.

SUMMARY

A security device for a coupler for a trailer comprises a bracket, a clamp lever cover, and a cover lock. The bracket is structurally arranged to be connected to a rearward portion of the coupler. The coupler comprises (i) the rearward portion connected to a tongue of the trailer, (ii) a forward portion that includes a socket structurally arranged for receiving a hitch ball, (iii) a ball clamp coupled to the forward portion and movable between a clamped structural arrangement and an unclamped structural arrangement, and (iv) a clamp lever coupled to the ball clamp and movable between an engaged structural arrangement and a disengaged structural arrangement. In the engaged structural arrangement the clamp lever holds the ball clamp in a clamped structural arrangement; in the disengaged structural arrangement the clamp lever permits movement of the ball clamp into an unclamped structural arrangement. In the unclamped structural arrangement the ball clamp permits movement of a hitch ball into and out of the socket; in the clamped structural arrangement the ball clamp retains within the socket a hitch ball received within the socket and thereby prevents movement of the retained hitch ball out of the socket; in the clamped structural arrangement the ball clamp prevents movement of a hitch ball into the socket. The clamp lever cover is engaged with the bracket and movable between a secured structural arrangement and an unsecured structural arrangement. In the secured structural arrangement the cover prevents movement of the clamp lever from the engaged structural arrangement to the disengaged structural arrangement; in the unsecured structural arrangement the cover permits movement of the clamp lever from the engaged structural arrangement to the disengaged structural arrangement. The cover lock is coupled to the clamp lever cover and movable between an unlocked structural arrangement and a locked structural arrangement. In the unlocked structural arrangement the cover lock permits movement of the clamp lever cover from the secured structural arrangement to the unsecured structural arrangement; in the locked structural arrangement the cover lock engages the bracket or the rearward portion so as to retain the clamp lever cover in the secured structural arrangement and prevent movement of the clamp lever cover from the secured structural arrangement into the unsecured structural arrangement.

Another apparatus comprises a coupler for a trailer and a security device. The coupler comprises a rearward portion, a forward portion, a ball clamp, and a clamp lever. The security device comprises a clamp lever cover and a cover lock. The rearward portion is structurally arranged to be connected to a tongue of a trailer. The forward portion includes a socket structurally arranged for receiving a hitch ball. The ball clamp is coupled to the forward portion and movable between an unclamped structural arrangement and a clamped structural arrangement. In the unclamped structural arrangement the ball clamp permits movement of a hitch ball into and out of the socket; in the clamped structural arrangement the ball clamp retains within the socket a hitch ball received within the socket and thereby prevents movement of the retained hitch ball out of the socket; in the clamped structural arrangement the ball clamp prevents movement of a hitch ball into the socket. The clamp lever is coupled to the ball clamp and movable between an engaged structural arrangement and a disengaged structural arrangement. In the engaged structural arrangement the clamp lever holds the ball clamp in the clamped structural arrangement; in the disengaged structural arrangement the clamp lever permits movement of the ball clamp into the unclamped structural arrangement. The clamp lever cover is engaged with the rearward portion and movable between a secured structural arrangement and an unsecured structural arrangement. In the secured structural arrangement the cover prevents movement of the clamp lever from the engaged structural arrangement to the disengaged structural arrangement; in the unsecured structural arrangement the cover permits movement of the clamp lever from the engaged structural arrangement to the disengaged structural arrangement. The cover lock is coupled to the cover and movable between an unlocked structural arrangement and a locked structural arrangement. In the unlocked structural arrangement the cover lock permits movement of the clamp lever cover from the secured structural arrangement into the unsecured structural arrangement; in the locked structural arrangement the cover lock prevents movement of the clamp lever cover from the secured structural arrangement into the unsecured structural arrangement.

Objects and advantages pertaining to a security device for securing a coupler of a trailer may become apparent upon referring to the exemplary embodiments illustrated in the drawings and disclosed in the following written description or appended claims.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 2A-2C are side views of the coupler for a trailer and the security device of FIGS. 1A-1C (i) with the clamp lever in a disengaged structural arrangement, a ball clamp in an unclamped structural arrangement, and a clamp lever cover in the unsecured structural arrangement (FIG. 2A), (ii) with the clamp lever in the engaged structural arrangement, the ball clamp in a clamped structural arrangement, and the clamp lever cover in the unsecured structural arrangement (FIG. 2B), and (iii) with the clamp lever in the engaged structural arrangement, the ball clamp in the clamped structural arrangement, and the clamp lever cover in the secured structural arrangement (FIG. 2C).

FIGS. 3A-3C are side, partial cross-sectional views of the coupler for a trailer and the security device of FIGS. 1A-1C (i) with the clamp lever in the disengaged structural arrangement, the ball clamp in the unclamped structural arrangement, and the clamp lever cover in the unsecured structural arrangement (FIG. 3A), (ii) with the clamp lever in the engaged structural arrangement, the ball clamp in the clamped structural arrangement, and the clamp lever cover in the unsecured structural arrangement (FIG. 3B), and (iii) with the clamp lever in the engaged structural arrangement, the ball clamp in the clamped structural arrangement, and the clamp lever cover in the secured structural arrangement (FIG. 3C).

FIGS. 4A-4C are side, partial cross-sectional views of the coupler for a trailer and the security device of FIGS. 1A-1C with a first example of a locking mechanism (i) with the clamp lever cover in the unsecured structural arrangement and the locking mechanism in an unlocked structural arrangement (FIG. 4A), (ii) with the clamp lever cover in the secured structural arrangement and the locking mechanism in the unlocked structural arrangement (FIG. 4B), and (iii) with the clamp lever cover in the secured structural arrangement and the locking mechanism in a locked structural arrangement (FIG. 4C); in all three drawings the ball clamp is in the clamped structural arrangement and the clamp lever is in the engaged structural arrangement.

FIGS. 8A-8C are side, partial cross-sectional views of the coupler and security device of FIG. 7A-7C with an example of a locking mechanism (i) with the clamp lever cover in the unsecured structural arrangement and the locking mechanism in an unlocked structural arrangement (FIG. 8A), (ii) with the clamp lever cover in the secured structural arrangement and the locking mechanism in the unlocked structural arrangement (FIG. 8B), and (iii) with the clamp lever cover in the secured structural arrangement and the locking mechanism in a locked structural arrangement (FIG. 8C); in all three drawings the ball clamp is in the clamped structural arrangement and the clamp lever is in the engaged structural arrangement.

Figure 1A:
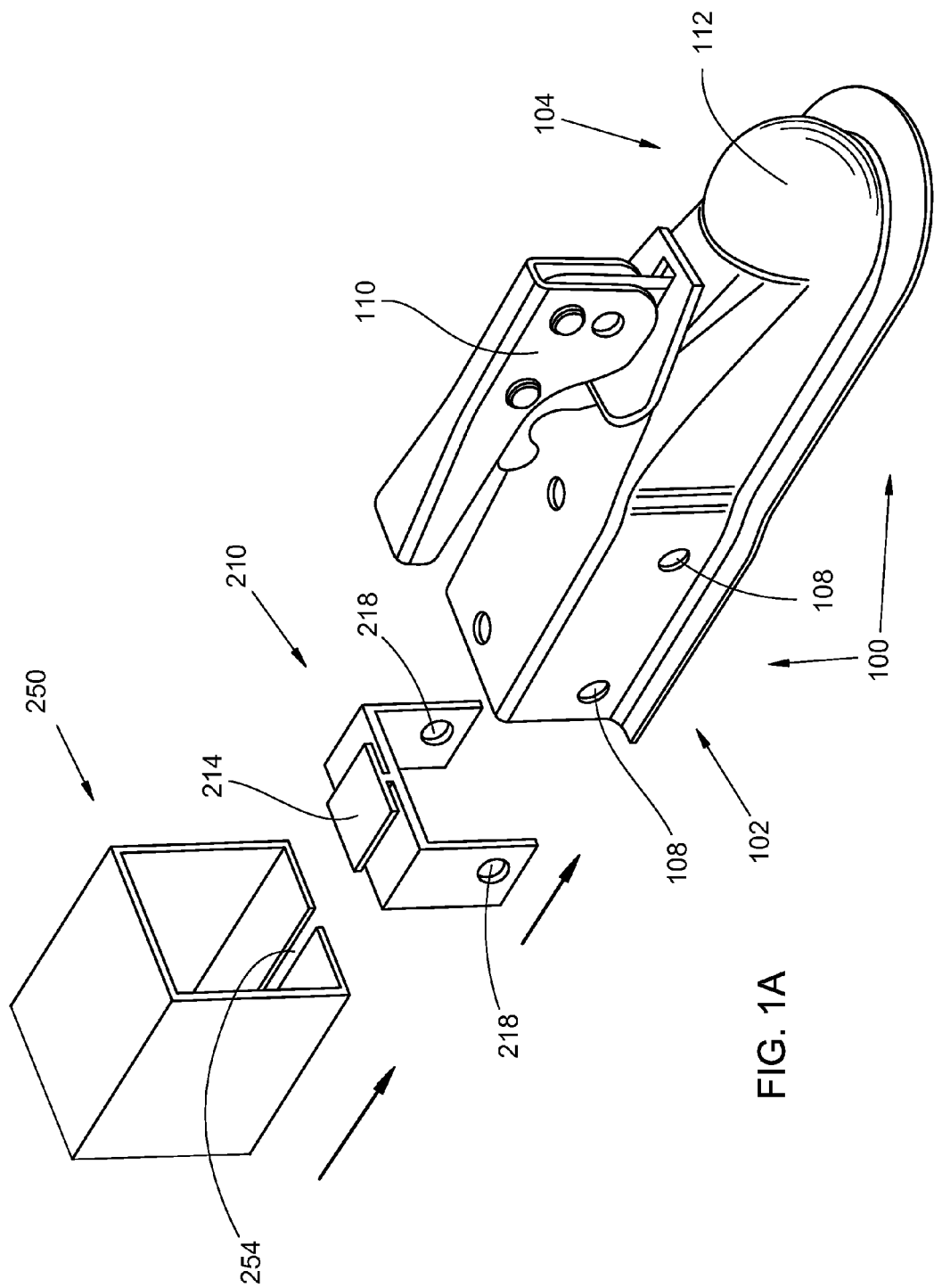
FIGS. 1A-1C are perspective views of a coupler for a trailer and a security device disassembled (FIG. 1A), assembled in an unsecured structural arrangement (FIG. 1B), and assembled in a secured structural arrangement (FIG. 1C); in all three drawings a clamp lever is in an engaged structural arrangement.
Figure 1B:
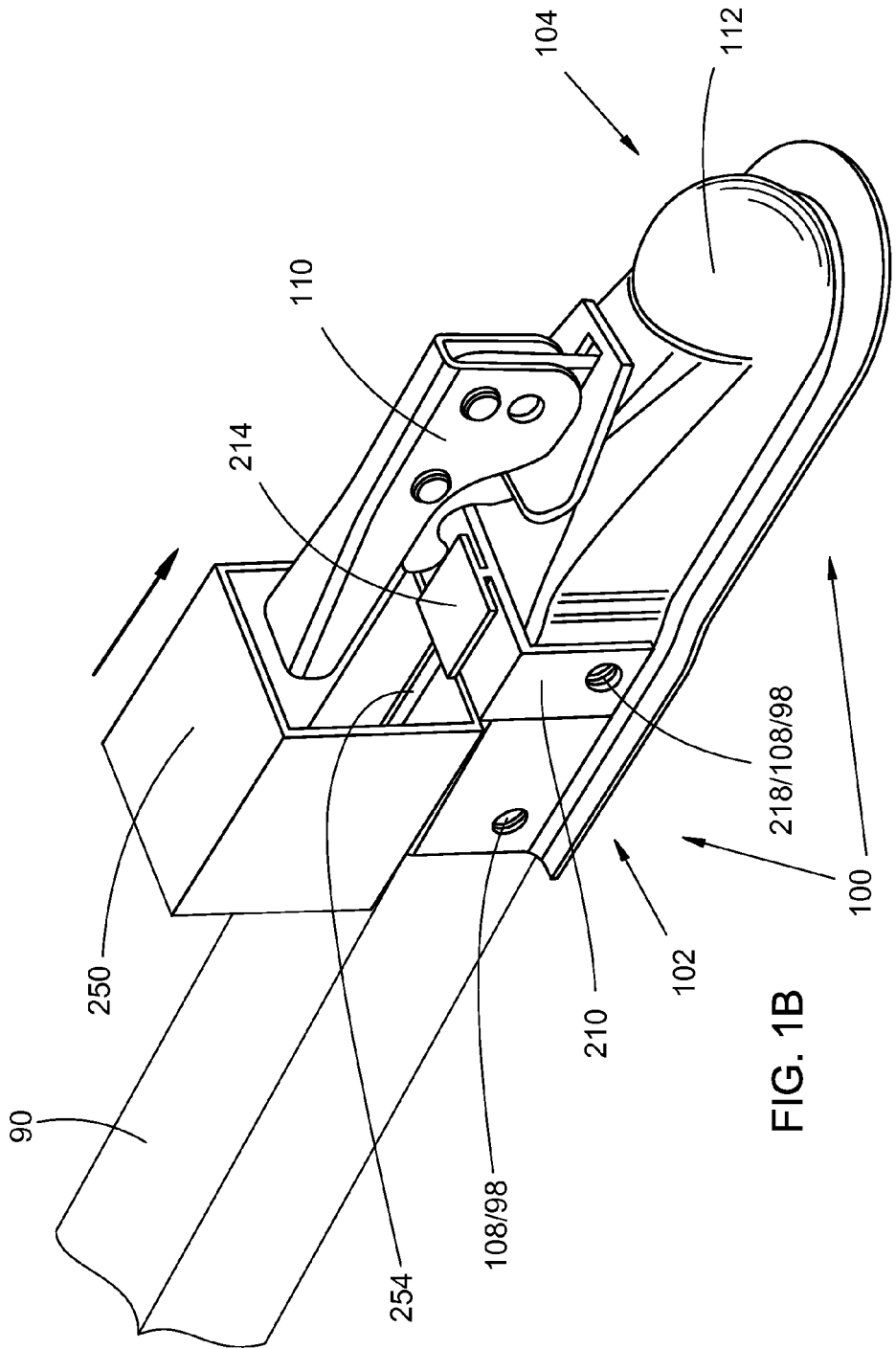
Figure 1C:
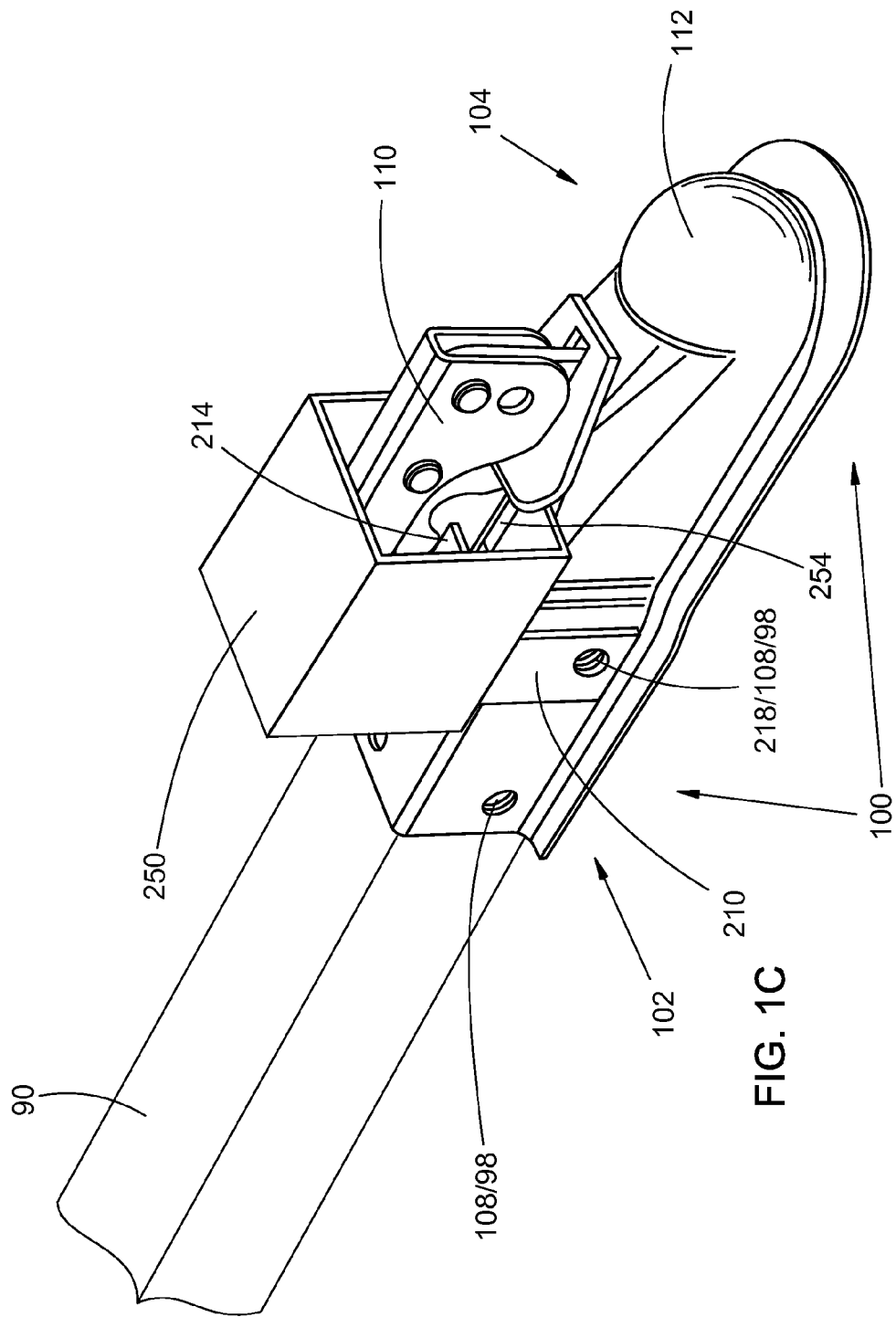

It should be noted that the embodiments depicted in this disclosure are shown only schematically, and that not all features may be shown in full detail or in proper proportion. Certain features or structures may be exaggerated relative to others for clarity. It should be noted further that the embodiments shown are only examples, and should not be construed as limiting the scope of the written description or appended claims.

DETAILED DESCRIPTION OF EMBODIMENTS

An example of a conventional coupler 100 is shown in FIGS. 1A-1C, 2A-2C, and 3A-3C; the coupler 100 connects a tongue 90 of a trailer to a hitch ball (not shown) of a towing vehicle or hitching post. The coupler 100 comprises a rearward portion 102, a forward portion 104, a ball clamp 116, and a clamp lever 110. The rearward portion 102 is connected in any suitable way to the tongue 90 of the trailer, e.g., by being integrally formed with the tongue of the trailer, by being welded onto the tongue of the trailer, or by being attached to the tongue of the trailer with one or more fasteners. In various examples, one or more fasteners can pass through holes 108 in the rearward portion 102 and through holes 98 in the tongue 90 of the trailer. The forward portion 104 of the coupler 10 includes a socket 112 structurally arranged for receiving a hitch ball (e.g., of a towing vehicle or a hitching post; not shown).

Figure 2B:
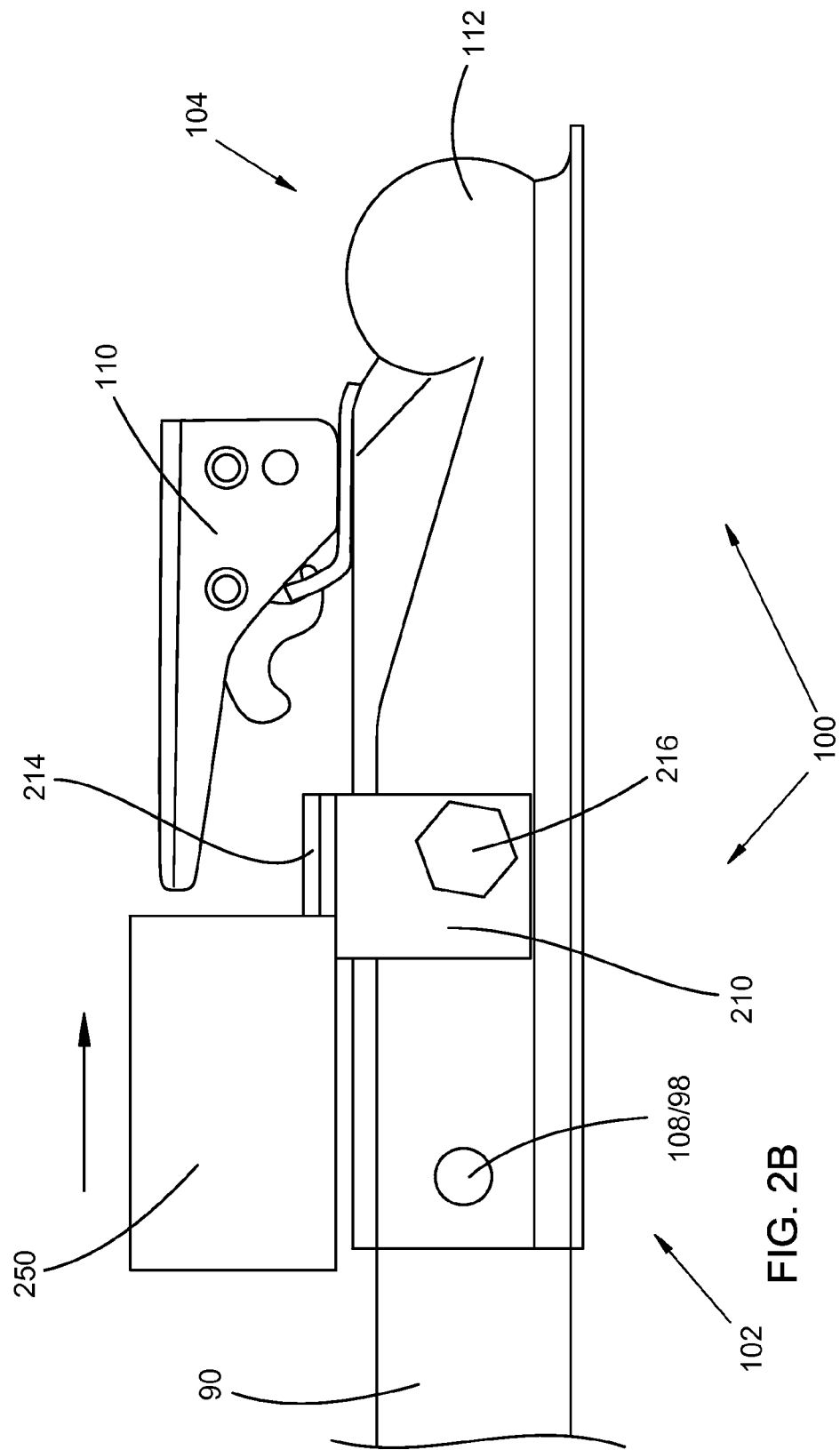
Figure 2C:
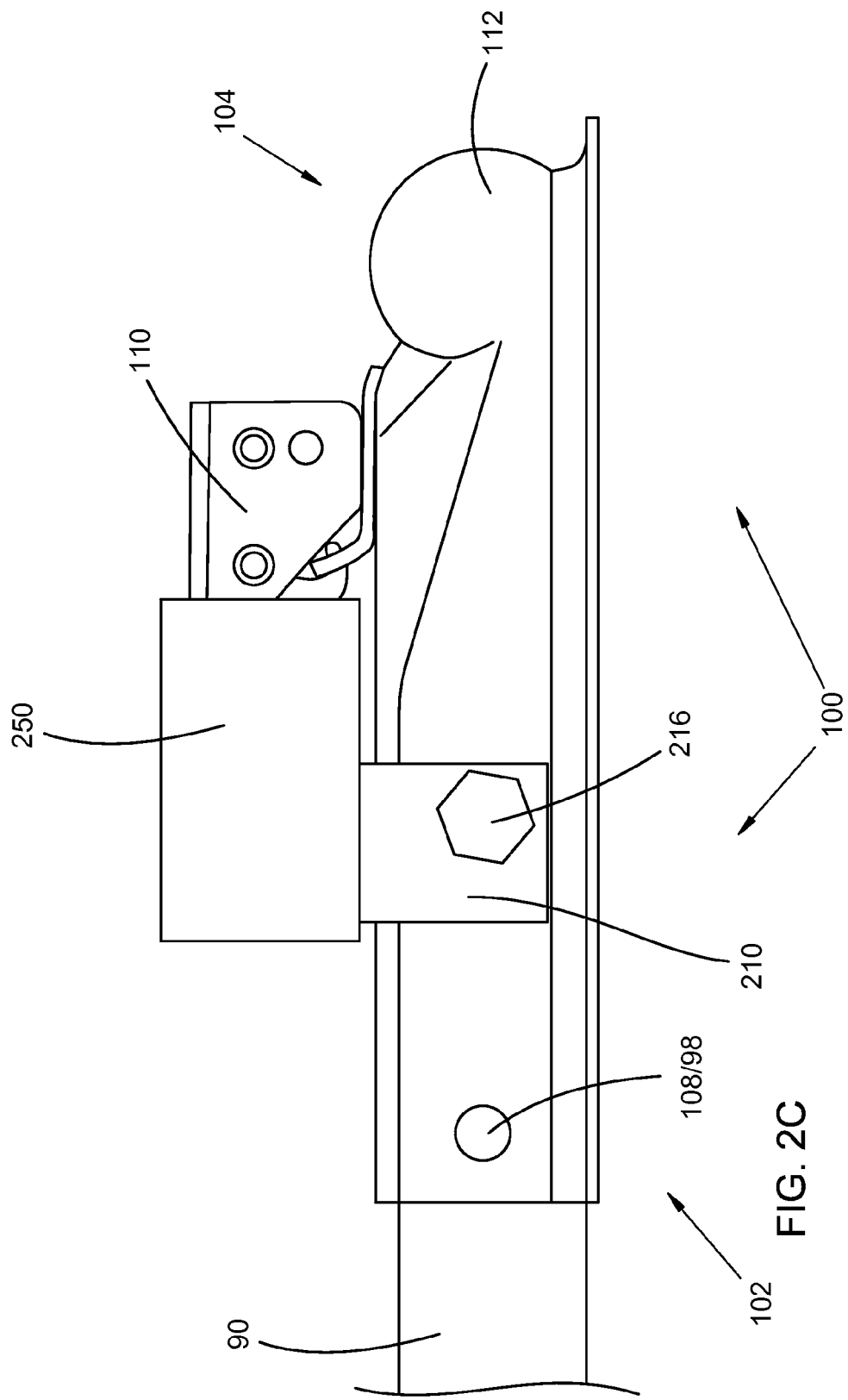
Figure 3C:
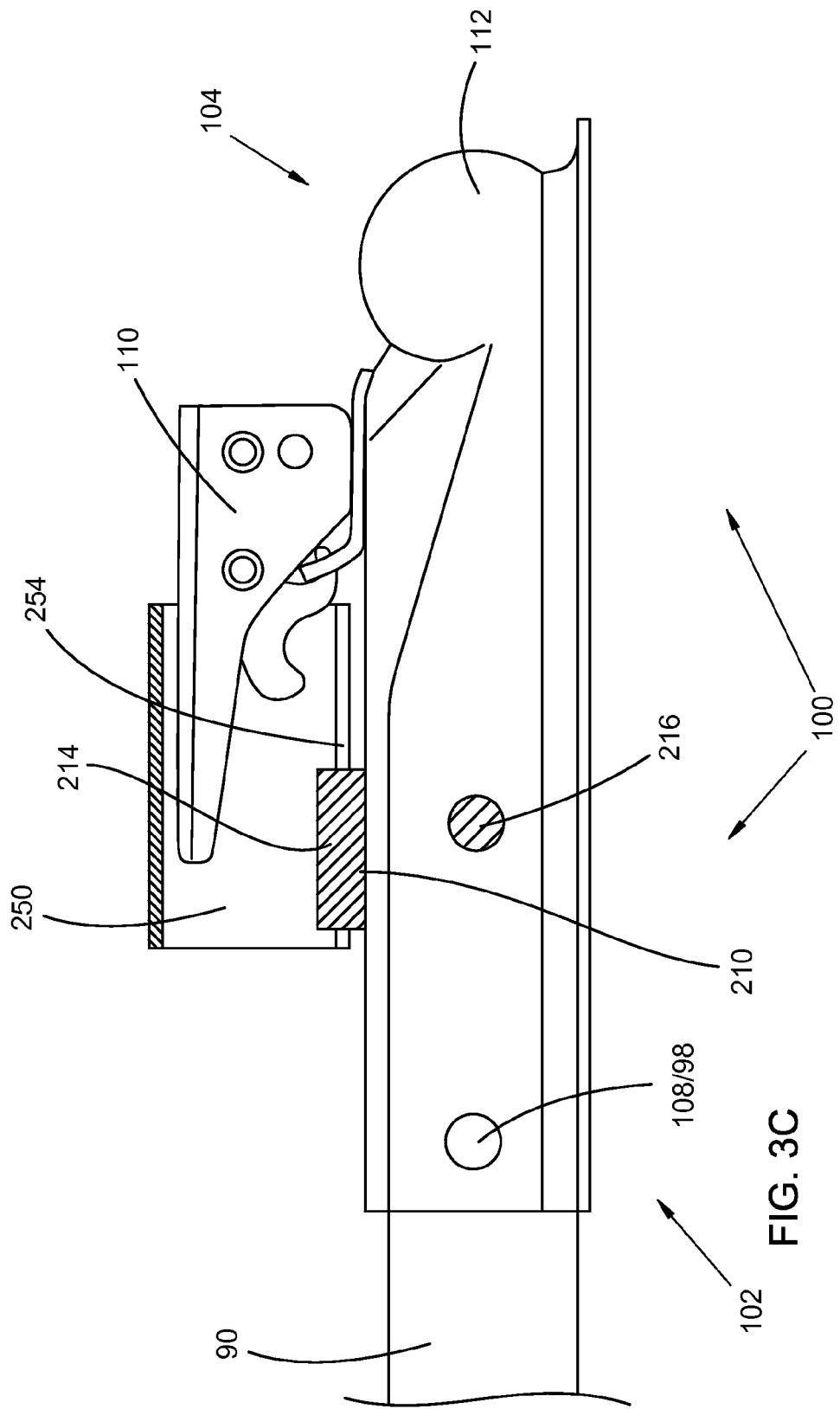

The ball clamp 116 is coupled to the forward portion 104 and is movable between a clamped structural arrangement (FIGS. 2B, 2C, 3B, and 3C) and an unclamped structural arrangement (FIGS. 2A and 3A). In the unclamped structural arrangement (FIGS. 2A and 3A), the ball clamp 116 permits movement of a hitch ball into and out of the socket 112. In the clamped structural arrangement (FIGS. 2B, 2C, 3B, and 3C), the ball clamp 116 retains within the socket 112 a hitch ball received within the socket 112 and thereby prevents movement of the retained hitch ball out of the socket 112. In the clamped structural arrangement (FIGS. 2B, 2C, 3B, and 3C), the ball clamp 116 prevents movement of a hitch ball into the socket 112. The clamp lever 110 is coupled to the ball clamp 116 and is movable between an engaged structural arrangement (FIGS. 1A-1C, 2B, 2C, 3B, and 3C) and a disengaged structural arrangement (FIGS. 2A and 3A). In the engaged structural arrangement (FIGS. 1A-1C, 2B, 2C, 3B, and 3C), the clamp lever 110 holds the ball clamp 116 in a clamped structural arrangement; in the disengaged structural arrangement (FIGS. 2A and 3A), the clamp lever 110 permits movement of the ball clamp 116 into the unclamped structural arrangement.

A security device for the coupler comprises a bracket 210, a clamp lever cover 250, and a cover lock 300; the cover lock 300 is omitted from FIGS. 2A-2C, 3A-3C, and 7A-7C for clarity. The bracket 210 is structurally arranged to be connected in any suitable way to the rearward portion 102 of the coupler 100, e.g., by being integrally formed with the rearward portion 102 (so that the bracket 210 and the rearward portion 102 of the coupler 100 are a unitary structure, as in FIGS. 7A-7C), by being welded onto the rearward portion 102, or by being attached to the rearward portion 102 with one or more fasteners. In various examples, the bracket 210 is structurally arranged to be attached to the rearward portion 102 by one or more fasteners 216 that extend at least partly through the bracket 210 (e.g., through holes 218) and the rearward portion 102 (e.g., through holes 108). In various examples, the bracket 210 can be structurally arranged to be attached to the rearward portion 102 by one or more fasteners 216 that extend at least partly through (i) the bracket 210 (e.g., through holes 218), (ii) the rearward portion 102 (e.g., through holes 108), and (iii) a tongue 90 of a trailer (e.g., through holes 98), thereby securing the rearward portion 102 to the tongue 90.

The clamp lever cover 250 can be engaged with the bracket 210 and is movable between a secured structural arrangement (FIGS. 2C and 3C) and an unsecured structural arrangement (FIGS. 2A, 2B, 3A, and 3B). In the secured structural arrangement (FIGS. 2C and 3C), the clamp lever cover 250 prevents movement of the clamp lever 110 from the engaged structural arrangement to the disengaged structural arrangement. In the unsecured structural arrangement (FIGS. 2A, 2B, 3A, and 3B), the clamp lever cover 250 permits movement of the clamp lever 110 from the engaged structural arrangement (FIGS. 2B and 3B) to the disengaged structural arrangement (FIGS. 2A and 3A).

Figure 6:
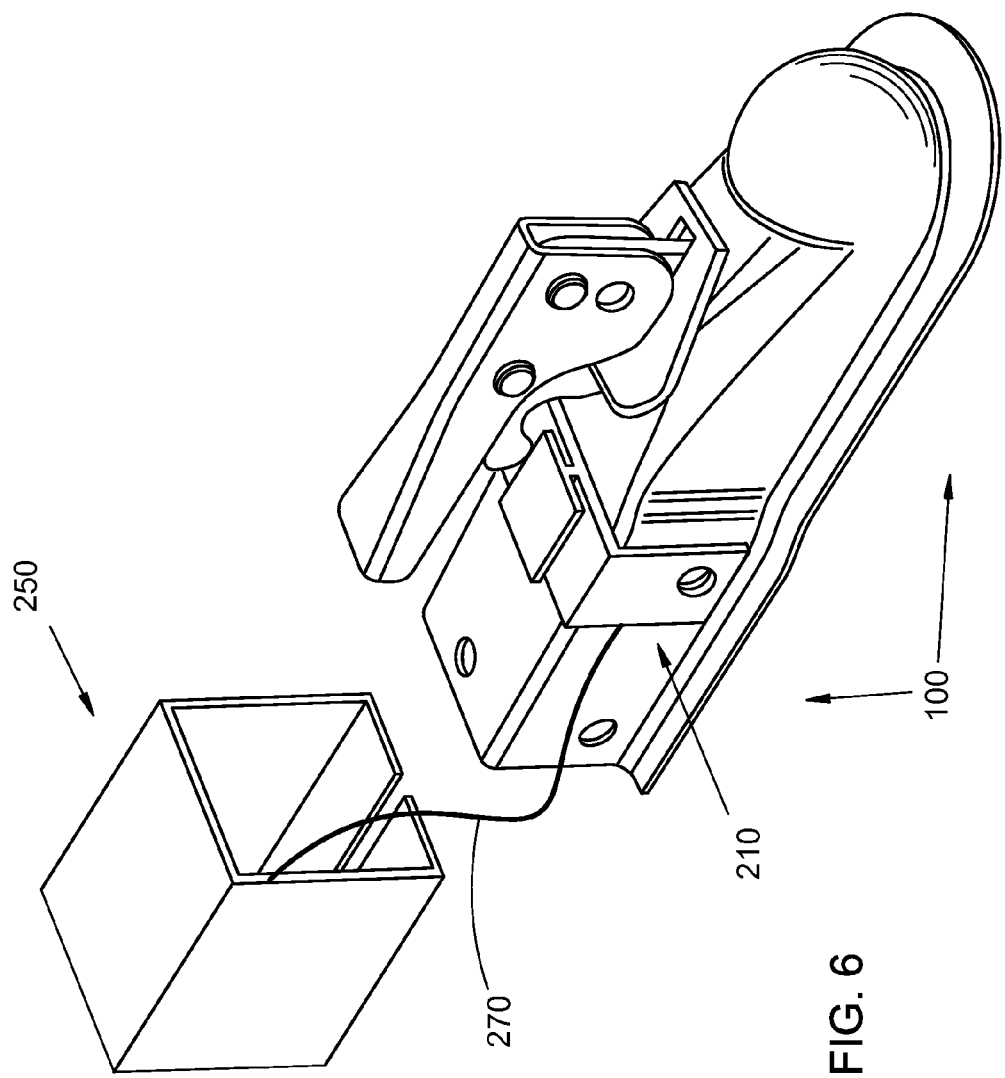
FIG. 6 is a perspective view of the coupler for a trailer and the security device including an optional tether for the clamp lever cover.
Figure 7A:
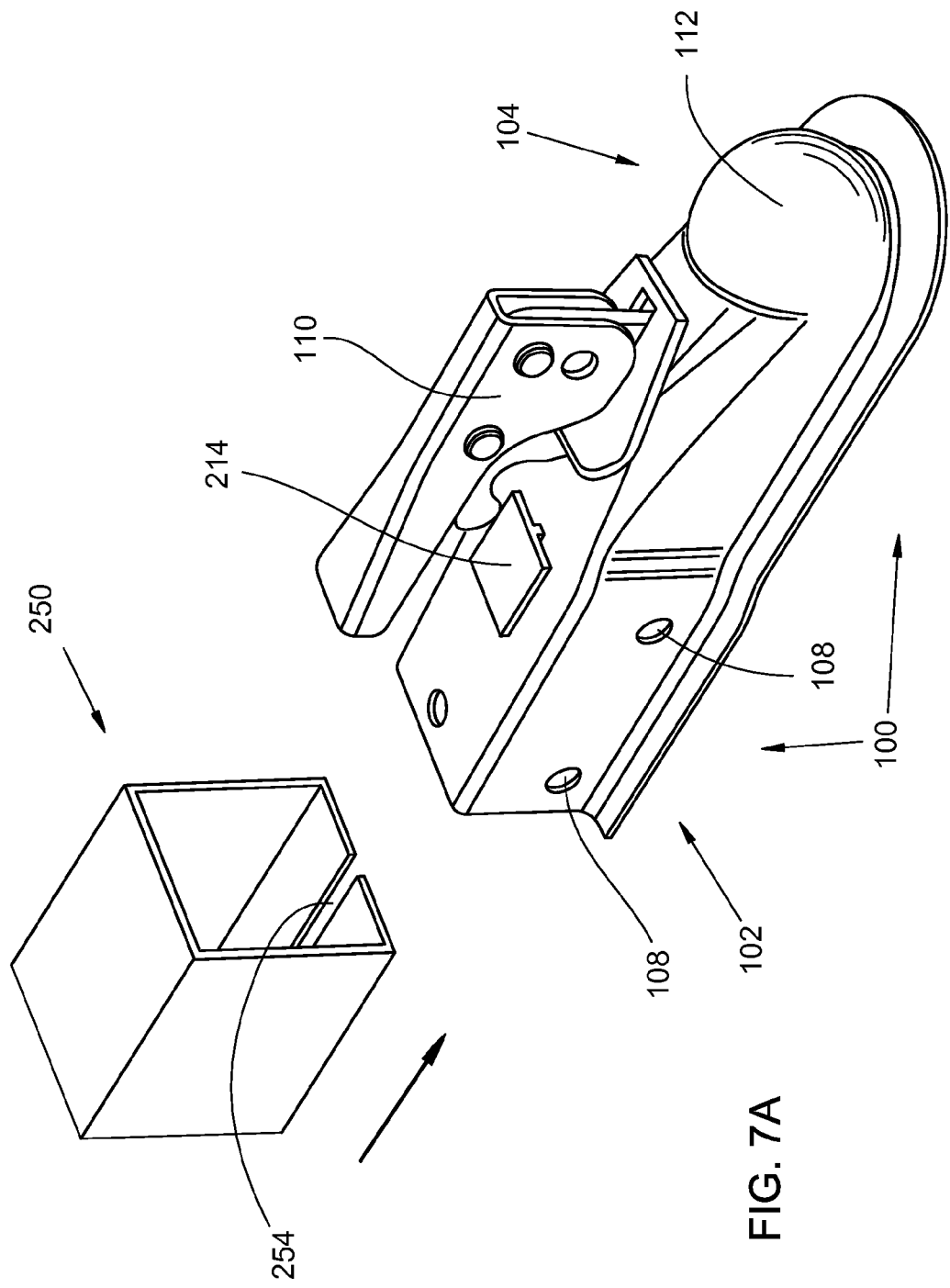
FIGS. 7A-7C are perspective views of combination coupler for a trailer and security device disassembled (FIG. 7A), assembled in an unsecured structural arrangement (FIG. 7B), and assembled in a secured structural arrangement (FIG. 7C); in all three drawings a clamp lever is in an engaged structural arrangement.
Figure 7B:
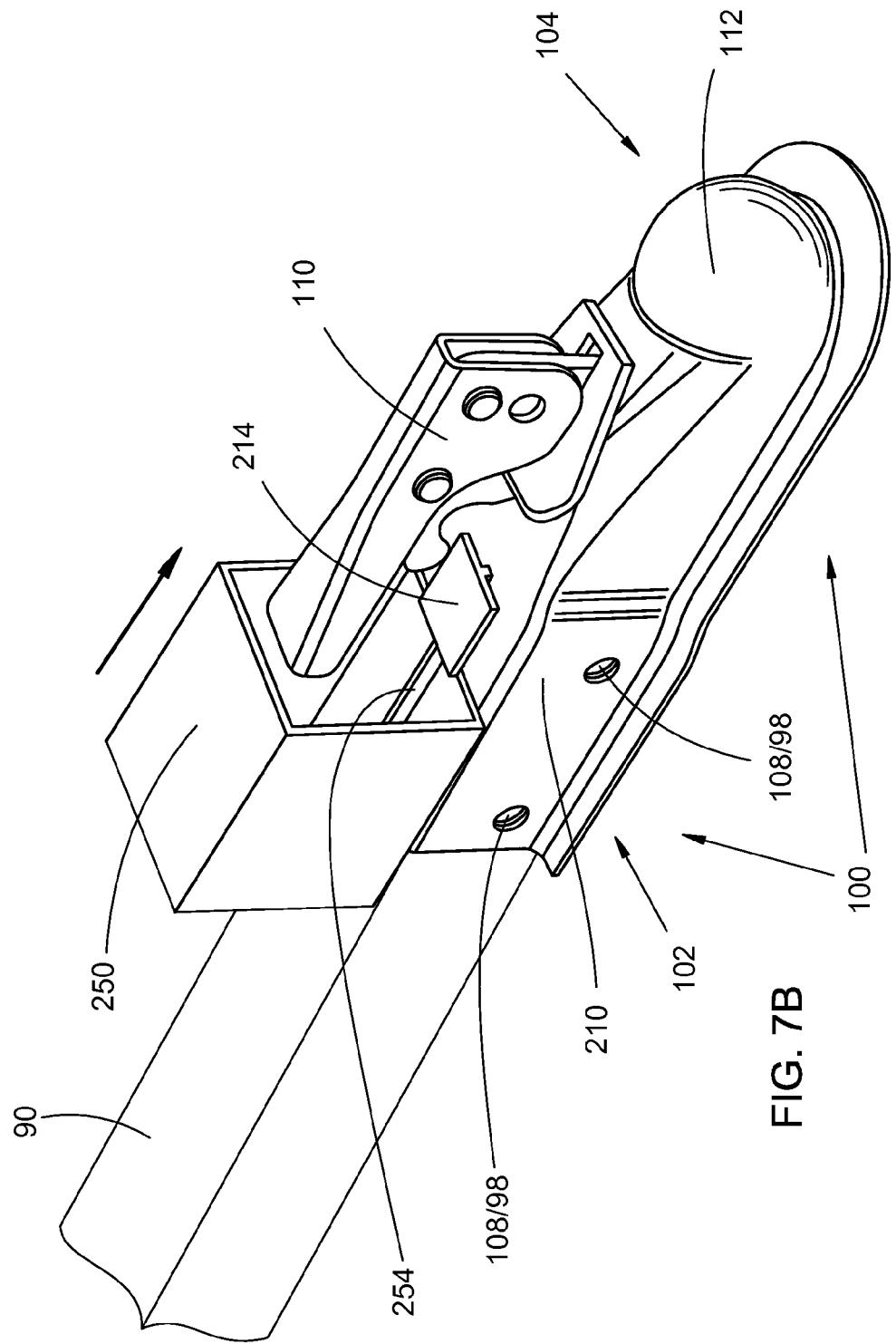
Figure 7C:
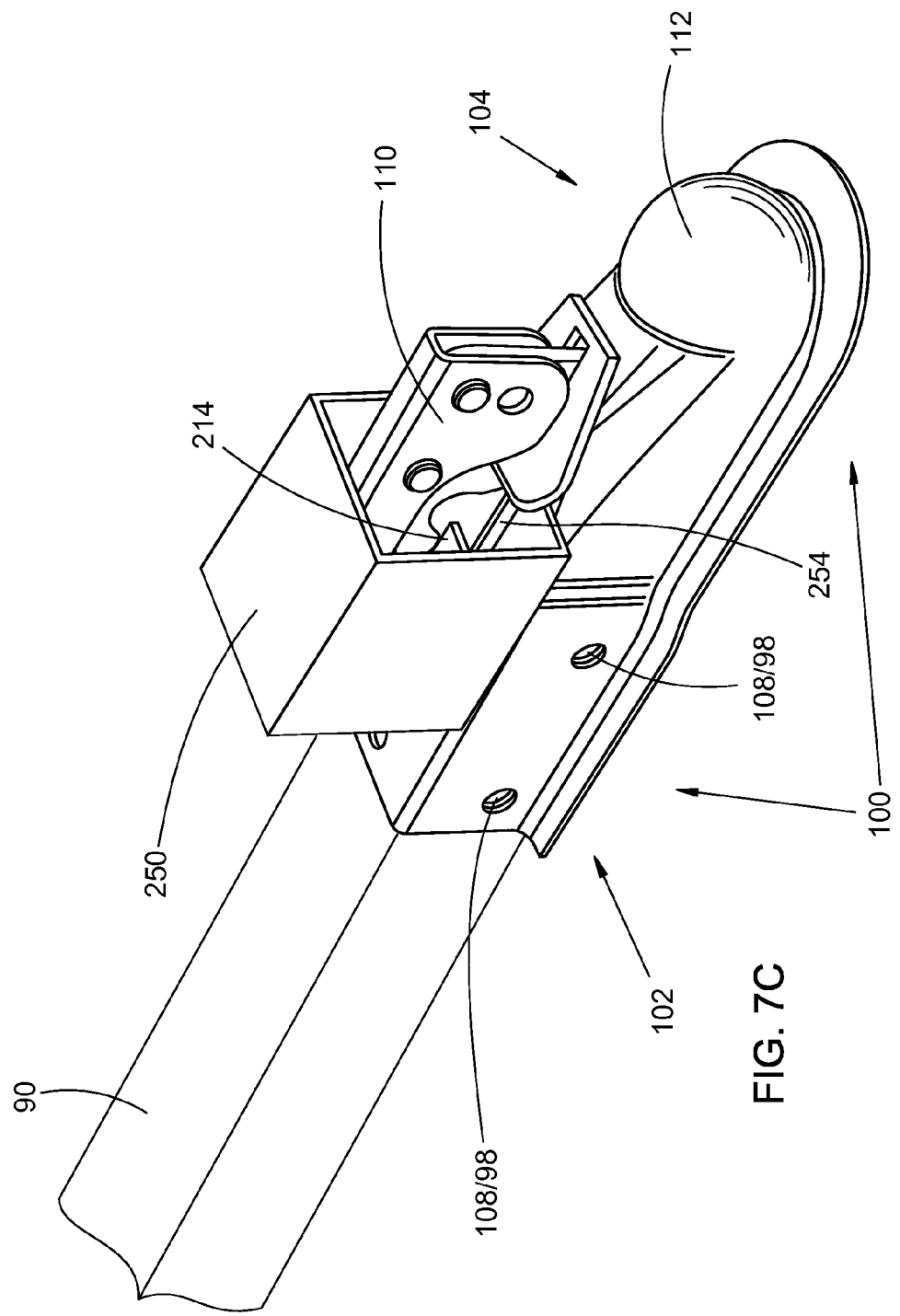

In various examples, the clamp lever cover 250 and the bracket 210 are engaged by a longitudinal ridge 214 protruding from the bracket 210 that is received in a longitudinal slot 254 in the clamp lever cover 250. The ridge 214 has a dovetailed or T-shaped transverse cross-section. The ridge 214 and slot 254 are structurally arranged so as to permit, when the cover lock 300 is in an unlocked structural arrangement, relative longitudinal movement of the bracket 210 and the engaged clamp lever cover 250 between the secured and unsecured structural arrangements. The ridge 214 and slot 254 are structurally arranged so as to retain the clamp lever cover 250 in the secured structural arrangement when the cover lock 300 is in the locked structural arrangement. The longitudinal ridge 214 can be integrally formed with the bracket 210, welded onto the bracket 210, or attached to the bracket 210 by one or more fasteners. In some examples, the ridge 214 and the slot 254 can be structurally arranged so that, in the unsecured structural arrangement, the clamp lever cover 250 is removable from the bracket 210, e.g., by sliding it rearward off of the end of the ridge 214. In that case, an optional tether 270 (FIG. 6) can be provided to keep the clamp lever cover 250 attached to the bracket 210 or coupler 100 even when it is removed from the bracket. In other examples, the bracket 210 or the clamp lever cover 250 can be structurally arranged to prevent removal of the clamp lever cover 250 from the bracket 210 (e.g., by including a stop or retainer in the slot 254 or on the ridge 214).

Figure 5A:
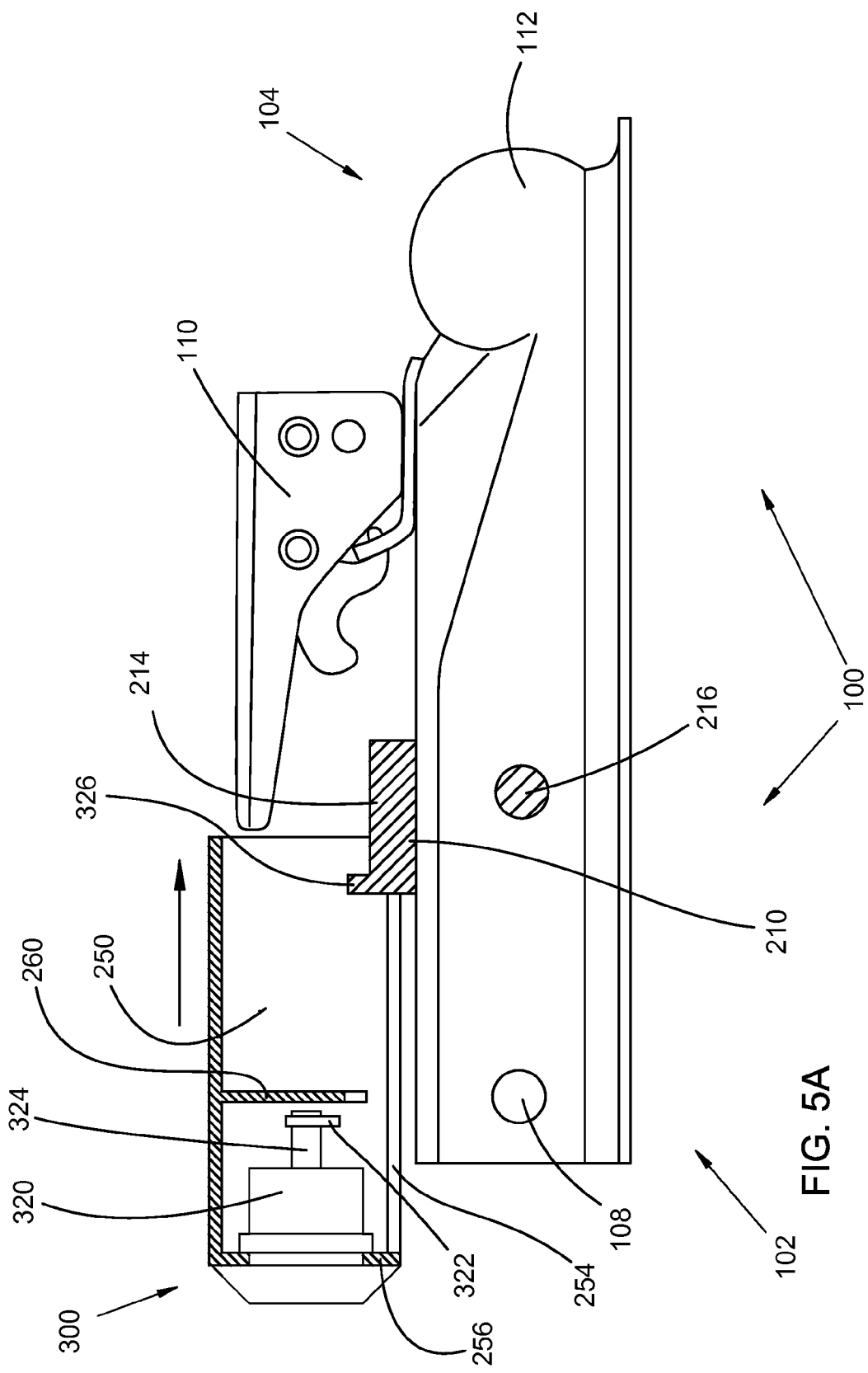
FIGS. 5A-5C are side, partial cross-sectional views of the coupler for a trailer and the security device of FIGS. 1A-1C with a second example of a locking mechanism (i) with the clamp lever cover in the unsecured structural arrangement and the locking mechanism in an unlocked structural arrangement (FIG. 5A), (ii) with the clamp lever cover in the secured structural arrangement and the locking mechanism in the unlocked structural arrangement (FIG. 5B), and (iii) with the clamp lever cover in the secured structural arrangement and the locking mechanism in a locked structural arrangement (FIG. 5C); in all three drawings the ball clamp is in the clamped structural arrangement and the clamp lever is in the engaged structural arrangement.
Figure 5B:
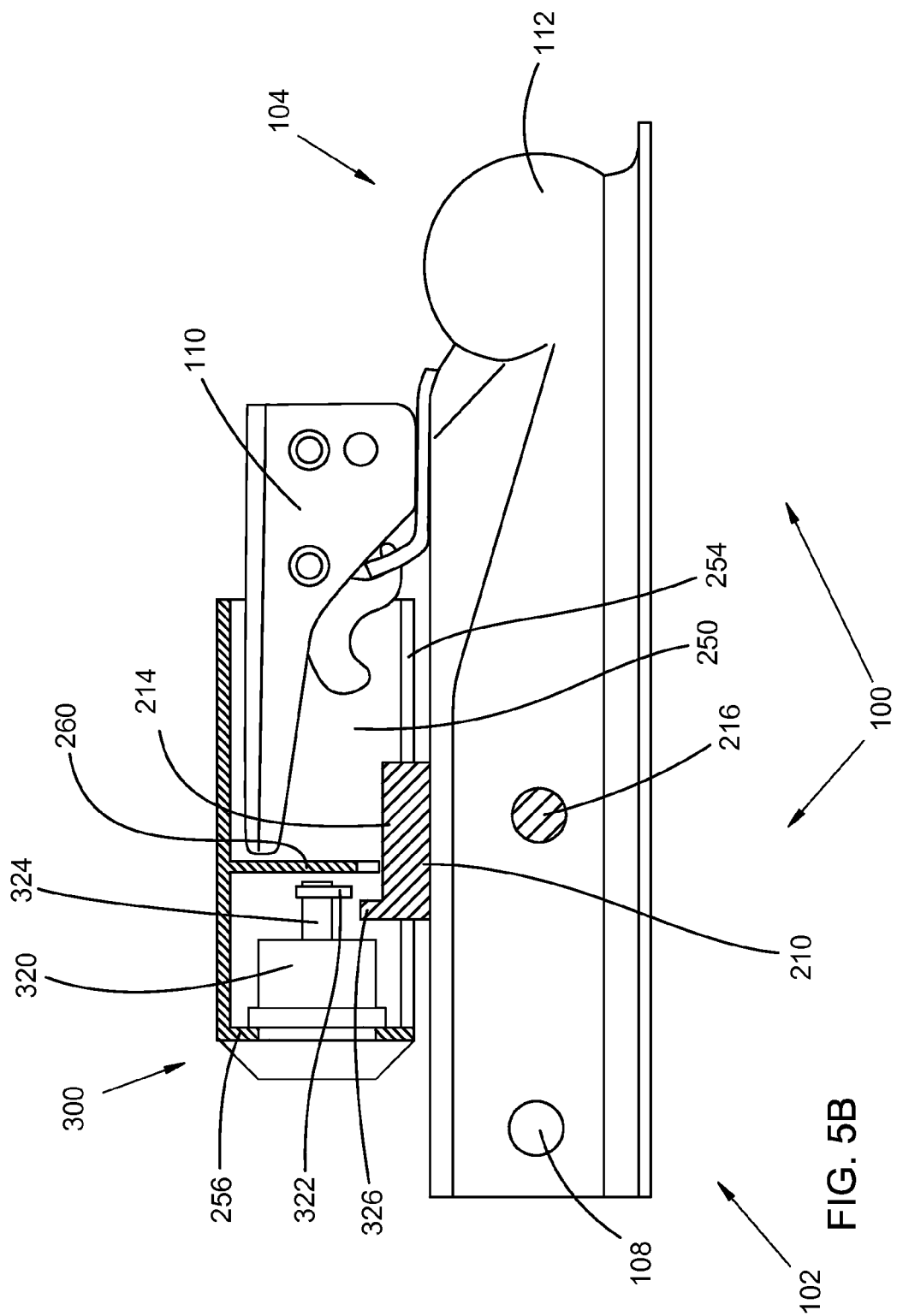
Figure 5C:
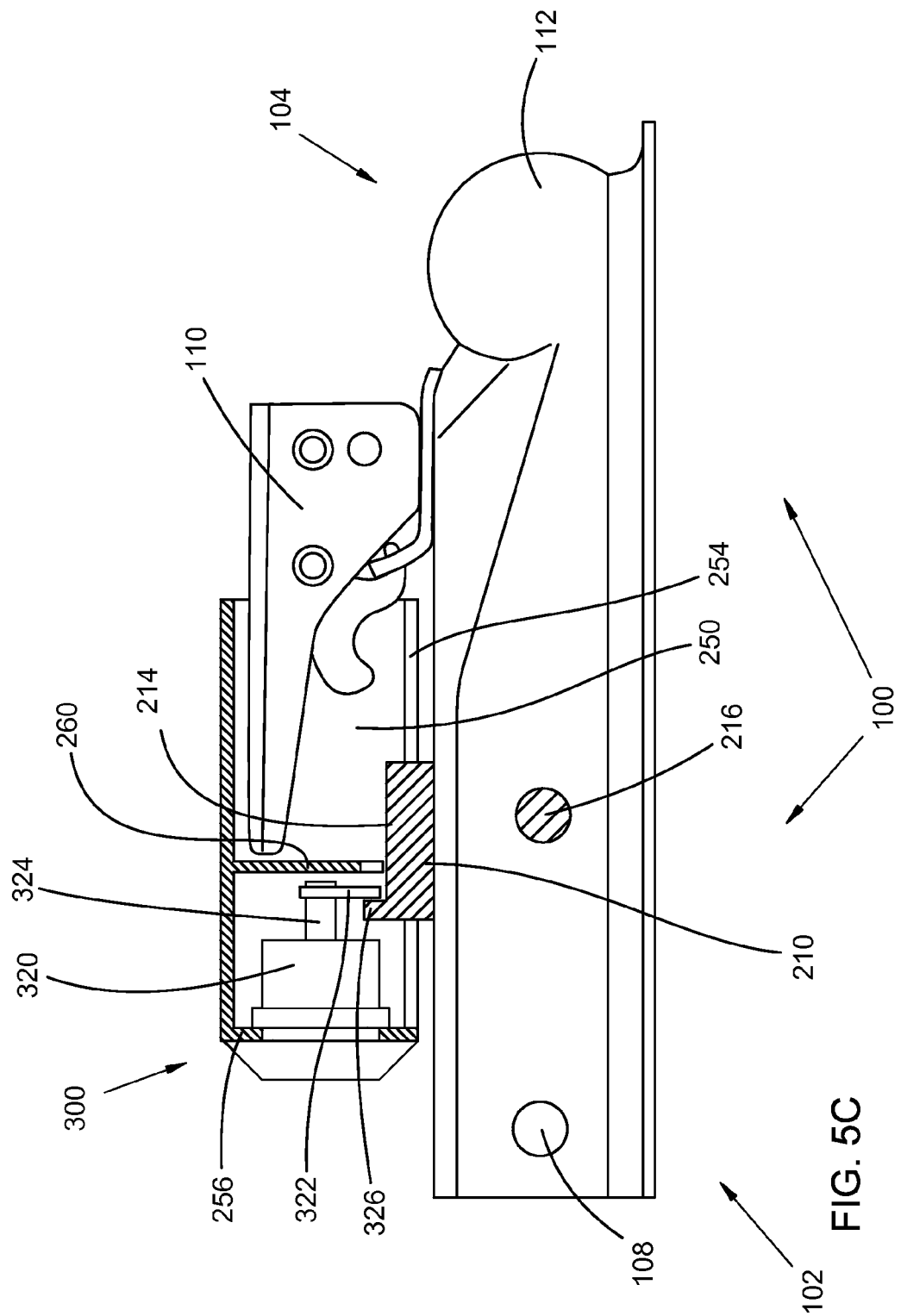
Figure 8B:
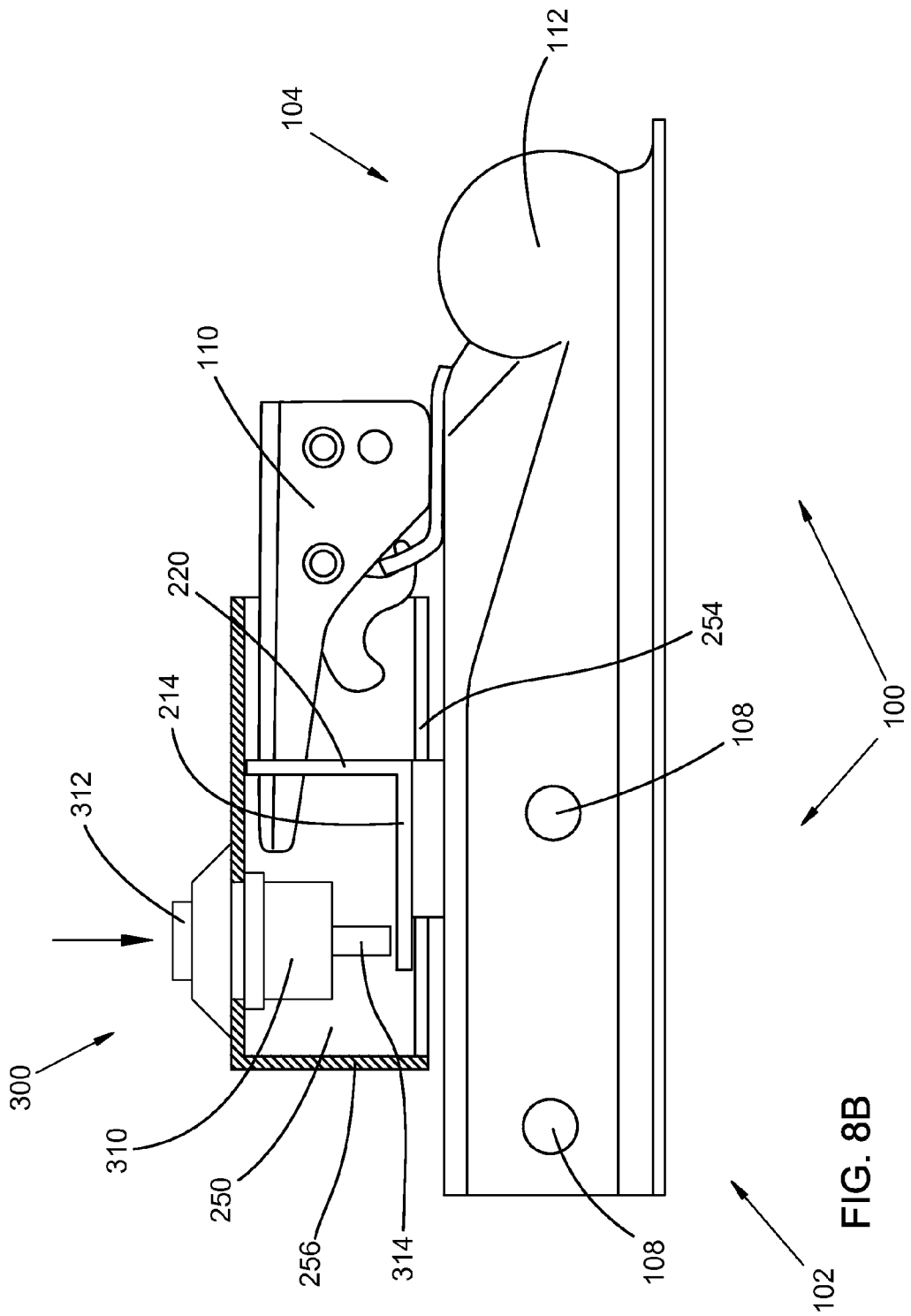
Figure 8C:
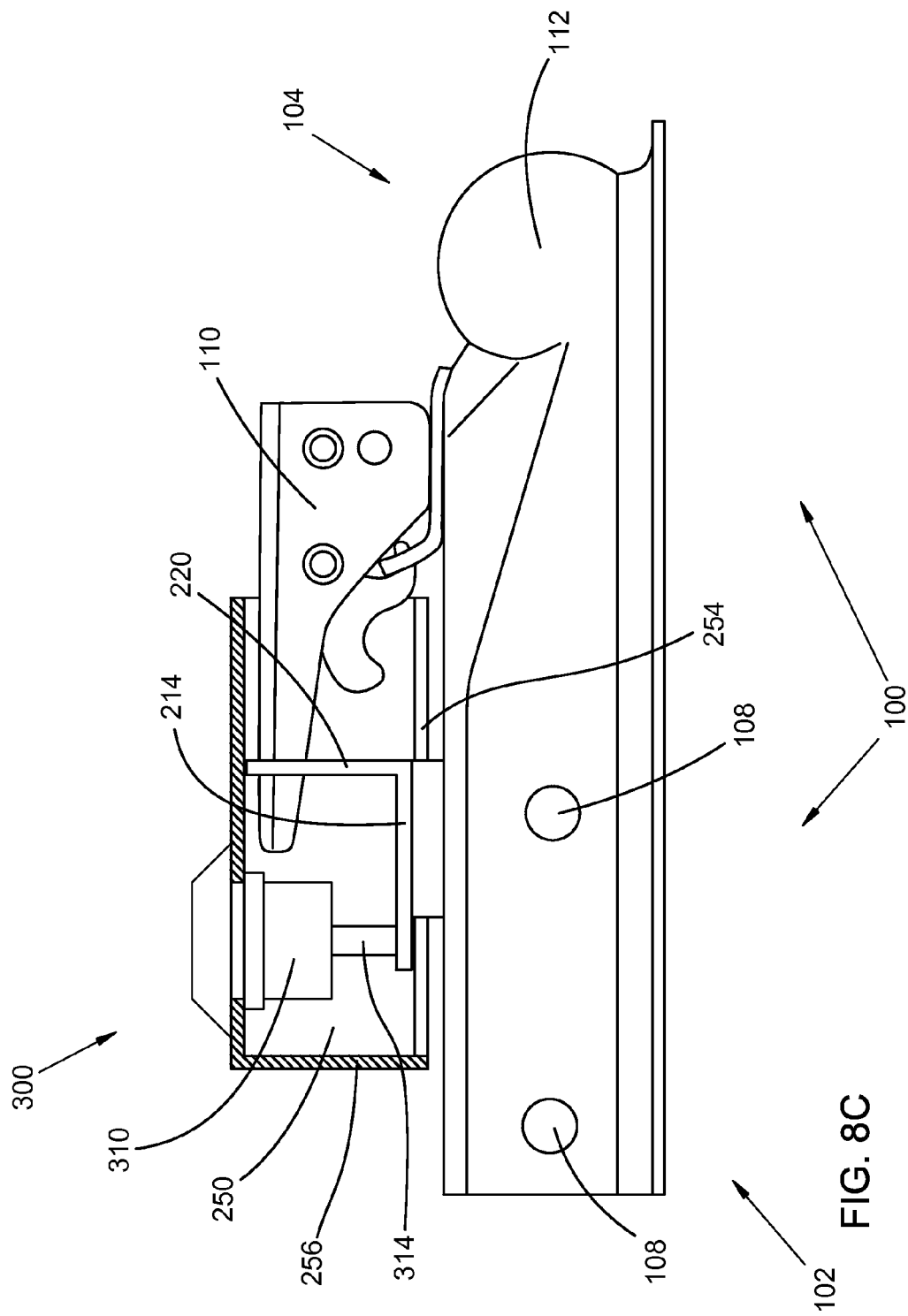

The cover lock 300 (FIGS. 4A-4C, 5A-5C, and 8A-8C) is coupled to the clamp lever cover 250 and movable between an unlocked structural arrangement (FIGS. 4A, 4B, 5A, 5B, 8A, and 8B) and a locked structural arrangement (FIGS. 4C, 5C, and 8C). In the unlocked structural arrangement the cover lock 300 permits movement of the clamp lever cover 250 from the secured structural arrangement (FIGS. 4B, 5B, and 8B) to the unsecured structural arrangement (FIGS. 4A, 5A, and 8A). In the locked structural arrangement (FIGS. 4C, 5C and 8C) the cover lock 300 engages the bracket 210 (or the rearward portion 102) so as to retain the clamp lever cover 250 in the secured structural arrangement and prevent movement of the clamp lever cover 250 into the unsecured structural arrangement. The cover lock 300 can include any suitable electronic or mechanical locking mechanism, e.g., a keyed lock, a combination lock, a cardkey lock, an RFID lock, or a biometric lock.

In a first example (FIGS. 4A-4C and 8A-8C), the cover lock 300 can include a reciprocating rod 314 structurally arranged to be received in a hole 316. The hole 316 can be formed in the bracket 210 or in the rear portion 102 of the coupler 100 (including in those examples wherein the bracket 210 and the rear portion 102 of the coupler 100 form a single integral unit). With the cover lock 300 in the unlocked structural arrangement (FIGS. 4A, 4B, 8A, and 8B), the rod 314 is absent from the hole 316, thereby permitting relative longitudinal movement of the bracket 210 and the engaged clamp lever cover 250 between the secured and unsecured structural arrangements. With the cover lock 300 in the locked structural arrangement (FIGS. 4C and 8C), the end of the rod 314 is received within the hole 316, thereby retaining the clamp lever cover 250 in the secured structural arrangement. Any suitable electronic or mechanical locking mechanism can be employed in the cover lock 300 to insert the rod 314 into the hole 316 in the locked arrangement and to release the rod 314 from the hole 316 in the unlocked arrangement.

One example of a suitable locking mechanism includes an inner lock cylinder 312 reciprocally moveable within an outer lock cylinder 310. The outer lock cylinder 310 is substantially rigidly connected to the clamp lever cover 250 and extends through a hole in the clamp lever cover 250. The rod 314 is substantially rigidly connected to the inner lock cylinder 312. The inner lock cylinder 312 moves within the outer lock cylinder 310 between the locked and unlocked structural arrangements. A suitable hardware key, alphanumeric combination, or electronic signal can be employed to enable movement of the inner lock cylinder 312 from the locked structural arrangement to the unlocked structural arrangement; such a key or combination may or may not be required for movement from the unlocked structural arrangement to the locked structural arrangement. In some instances the cover lock 300 can include a frustoconical flange secured to an outer surface of the clamp lever cover 250. Such a flange can prevent or hinder unauthorized tampering with the cover lock 300 from outside the clamp lever cover 250.

In a second example (FIGS. 5A-5C), the cover lock 300 can include a rotating rod 324, a transverse tab 322 attached to the rod 324, and a retainer 326 structurally arranged to engage the tab 322. The retainer 326 can be formed on the bracket 210 or on the rear portion 102 of the coupler 100 (including in those examples wherein the bracket 210 and the rear portion 102 of the coupler 100 form a single integral unit). With the cover lock 300 in the unlocked structural arrangement (FIGS. 5A and 5B), the tab 322 does not engage the retainer 326, thereby permitting relative longitudinal movement of the bracket 210 and the engaged clamp lever cover 250 between the secured and unsecured structural arrangements. With the cover lock 300 in the locked structural arrangement (FIG. 5C), the tab 322 engages the retainer 326, thereby retaining the clamp lever cover 250 in the secured structural arrangement. Any suitable electronic or mechanical locking mechanism can be employed in the cover lock 300 to engage the tab 322 with the retainer 326 in the locked arrangement and to disengage the tab 322 from the retainer 326 in the unlocked arrangement.

One example of a suitable locking mechanism includes a rod 324 rotatable within a lock cylinder 320. The lock cylinder 320 is substantially rigidly connected to the clamp lever cover 250 and extends through a hole in the clamp lever cover 250. The rod 324 rotates within the lock cylinder 320 between the locked and unlocked structural arrangements. A suitable hardware key, alphanumeric combination, or electronic signal can be employed to enable movement of the rod 324 from the locked structural arrangement to the unlocked structural arrangement; such a key or combination may or may not be required for movement from the unlocked structural arrangement to the locked structural arrangement. In some instances the cover lock 300 can include a frustoconical flange secured to an outer surface of the clamp lever cover 250. Such a flange can prevent or hinder unauthorized tampering with the cover lock 300 from outside the clamp lever cover 250.

In various examples, the clamp lever cover 250 includes a back wall 256 that at least partly encloses an interior volume of the clamp lever cover 250, and an interior partition dividing a rearward portion of the interior volume from a forward portion of the interior volume. In the examples of FIGS. 4A-4C and 8A-8C, the partition 220 is attached to or integrally formed with the bracket 210 or the rearward portion 102 of the coupler 100; in the example of FIGS. 5A-5C, the partition 260 is attached to or integrally formed within the clamp lever cover 250. The cover lock 300 can include an exterior portion outside the clamp lever cover 250 and an interior portion within the rearward portion of the interior volume. In the secured structural arrangement (FIGS. 4B, 4C, 5B, 5C, 8B, and 8C), at least a portion of the clamp lever 110 is received within the forward portion of the interior volume, while the clamp lever cover 250, the back wall 256, and the partition 220 or 260 prevent access to the interior portion of the cover lock 300. By preventing such access, the likelihood is reduced of an unauthorized person being able to destroy, disable, or otherwise tamper with the cover lock 300 (e.g., by cutting or breaking the rod 314 or the rod 324, by forcing disengagement of the tab 322 from the retainer 326, or by forcing the rod 314 out of the hole 316). Note that either placement of the partition (i.e., on the bracket 210 or within the clamp lever cover 250) can be employed with any type or arrangement of the cover lock 300 (e.g., reciprocating, rotating, or other). Note that the partition can include a notch, slot, or other opening to accommodate parts of the coupler 100 or security device. In the examples of FIGS. 4A-4C and 8A-8C, in the secured structural arrangement, a portion of the clamp lever 110 is received through a notch in the partition 220; in the example of FIGS. 5A-5C, a notch in the partition 260 allows the retainer 326 to pass through the partition as the clamp lever cover 250 moves between the secured and unsecured structural arrangements.

The bracket 210 and the clamp lever cover 250 can be fabricated from any one or more suitably strong and rigid materials; one or more metals or metal alloys can be typically employed. Examples of suitable materials can include steel, stainless steel, aluminum, other metal or metal alloy, various plastics, various composite materials (e.g., fibers embedded in a polymer matrix), one or more other suitable materials, or combinations thereof. The bracket 210 and the clamp lever cover 250 can comprise the same one or more materials, or can comprise differing materials. Various parts or panels can be integrally formed or can be variously assembled and substantially rigidly connected together (e.g., by welding metal parts).

The security device can be employed in various circumstances. In a first example, the security device can be used to prevent unauthorized hitching of an unhitched trailer. With no hitch ball received in the socket of the trailer's coupler, the clamp lever is moved to the engaged structural arrangement, thereby moving the ball clamp into the clamped structural arrangement to prevent insertion of a hitch ball into the socket. The clamp lever cover is then moved into the secured structural arrangement and the cover lock is moved into the locked structural arrangement. The secured and locked security device prevents disengagement of the clamp lever and unauthorized insertion of a hitch ball into the socket of the coupler. The trailer is thereby secured against unauthorized hitching. When authorized hitching of the trailer is desired, the cover lock can be unlocked and the clamp lever cover can be moved into the unsecured structural arrangement, thereby enabling disengagement of the clamp lever and insertion of a hitch ball into the socket of the coupler.

In a second example, a hitched, parked trailer can be secured against unauthorized removal from its hitch (e.g., a hitching post or parked vehicle). With a hitch ball of a hitching post or vehicle inserted into the socket of the trailer's coupler, the clamp lever is moved to the engaged structural arrangement, thereby moving the ball clamp into the clamped structural arrangement to retain the hitch ball within the socket and prevent its removal from the socket. The clamp lever cover is then moved into the secured structural arrangement and the cover lock is moved into the locked structural arrangement. The secured and locked security device prevents disengagement of the clamp lever and unauthorized removal of the retained hitch ball from the socket of the coupler. The trailer is thereby secured against unauthorized removal from the hitch. When authorized unhitching of the trailer is desired, the cover lock can be unlocked and the clamp lever cover can be moved into the unsecured structural arrangement, thereby enabling disengagement of the clamp lever and removal of the hitch ball from the socket of the coupler.

In a third example, the security device can be employed to ensure that the coupler does not become disengaged from the hitch ball of a towing vehicle while the trailer is being towed. With the hitch ball of the towing vehicle inserted into the socket of the trailer's coupler, the clamp lever is moved to the engaged structural arrangement, thereby moving the ball clamp into the clamped structural arrangement to retain the hitch ball within the socket and prevent it from exiting the socket. The clamp lever cover is then moved into the secured structural arrangement and the cover lock is moved into the locked structural arrangement. The secured and locked security device prevents inadvertent disengagement of the clamp lever and possible exiting of the hitch ball from the socket and detachment of the trailer from the towing vehicle. When attachment to the towing vehicle is no longer desired, the cover lock can be unlocked and the clamp lever cover can be moved into the unsecured structural arrangement, thereby enabling disengagement of the clamp lever and removal of the hitch ball of the towing vehicle from the socket of the coupler.

A security device for the trailer coupler can be provided in a variety of ways in a variety of circumstances. In one circumstance, the security device can be provided as an original component of a trailer. In that case, (i) the bracket, coupler, and tongue can be integrally formed, (ii) the bracket and coupler can form a single, unitary structure that is separate from and assembled with the tongue, or (iii) the bracket, coupler, and tongue can comprise discrete parts that are assembled together. In another circumstance, the security device and coupler can be provided together as an add-on product for a trailer. In that case, (i) the bracket and coupler can form a single, unitary structure that is assembled with the tongue of the trailer or (ii) the bracket and coupler can comprise discrete parts that are assembled together with the tongue of the trailer. In still another circumstance, the security device can be provided as an add-on product for a trailer with a coupler. In that case, the bracket can be assembled with the coupler (regardless of whether the coupler and tongue are integrally formed or are discrete parts that are assembled together).

In addition to the preceding, the following examples fall within the scope of the present disclosure or appended claims:

Example 1

A security device for a coupler for a trailer, the device comprising a bracket, a clamp lever cover, and a cover lock, wherein: (a) the bracket is structurally arranged to be connected to a rearward portion of the coupler of the trailer, which coupler comprises (i) the rearward portion connected to a tongue of the trailer, (ii) a forward portion that includes a socket structurally arranged for receiving a hitch ball, (iii) a ball clamp coupled to the forward portion and movable between a clamped structural arrangement and an unclamped structural arrangement, and (iv) a clamp lever coupled to the ball clamp and movable between an engaged structural arrangement and a disengaged structural arrangement, wherein (v) in the engaged structural arrangement the clamp lever holds the ball clamp in a clamped structural arrangement and in the disengaged structural arrangement the clamp lever permits movement of the ball clamp into an unclamped structural arrangement, and (vi) in the unclamped structural arrangement the ball clamp permits movement of a hitch ball into and out of the socket, in the clamped structural arrangement the ball clamp retains within the socket a hitch ball received within the socket and thereby prevents movement of the retained hitch ball out of the socket, and in the clamped structural arrangement the ball clamp prevents movement of a hitch ball into the socket; (b) the clamp lever cover is engaged with the bracket and movable between a secured structural arrangement and an unsecured structural arrangement, wherein (i) in the secured structural arrangement the cover prevents movement of the clamp lever from the engaged structural arrangement to the disengaged structural arrangement and (ii) in the unsecured structural arrangement the cover permits movement of the clamp lever from the engaged structural arrangement to the disengaged structural arrangement; and (c) the cover lock is coupled to the clamp lever cover and movable between an unlocked structural arrangement and a locked structural arrangement, wherein (i) in the unlocked structural arrangement the cover lock permits movement of the clamp lever cover from the secured structural arrangement to the unsecured structural arrangement and (ii) in the locked structural arrangement the cover lock engages the bracket or the rearward portion so as to retain the clamp lever cover in the secured structural arrangement and prevent movement of the clamp lever cover from the secured structural arrangement into the unsecured structural arrangement.

Example 2

The apparatus of Example 1 wherein the bracket is structurally arranged to be attached to the rearward portion of the coupler by one or more fasteners that extend at least partly through the bracket and at least partly through the rearward portion of the coupler.

Example 3

The apparatus of Example 1 wherein the bracket is structurally arranged to be attached to the rearward portion of the coupler by one or more fasteners that extend at least partly through (i) the bracket, (ii) the rearward portion of the coupler, and (iii) a tongue of a trailer, thereby securing the rearward portion of the coupler to the tongue of the trailer.

Example 4

An apparatus comprising a coupler for a trailer and a security device, wherein: (a) the coupler comprises a rearward portion, a forward portion, a ball clamp, and a clamp lever; (b) the security device comprises a clamp lever cover and a cover lock; (c) the rearward portion of the coupler is structurally arranged to be connected to a tongue of a trailer; (d) the forward portion of the coupler includes a socket structurally arranged for receiving a hitch ball; (e) the ball clamp is coupled to the forward portion of the coupler and movable between an unclamped structural arrangement and a clamped structural arrangement, wherein (i) in the unclamped structural arrangement the ball clamp permits movement of a hitch ball into and out of the socket, (ii) in the clamped structural arrangement the ball clamp retains within the socket a hitch ball received within the socket and thereby prevents movement of the retained hitch ball out of the socket, and (iii) in the clamped structural arrangement the ball clamp prevents movement of a hitch ball into the socket; (f) the clamp lever is coupled to the ball clamp and movable between an engaged structural arrangement and a disengaged structural arrangement, wherein (i) in the engaged structural arrangement the clamp lever holds the ball clamp in the clamped structural arrangement and (ii) in the disengaged structural arrangement the clamp lever permits movement of the ball clamp into the unclamped structural arrangement; (g) the clamp lever cover is engaged with the rearward portion and movable between a secured structural arrangement and an unsecured structural arrangement, wherein (i) in the secured structural arrangement the cover prevents movement of the clamp lever from the engaged structural arrangement to the disengaged structural arrangement and (ii) in the unsecured structural arrangement the cover permits movement of the clamp lever from the engaged structural arrangement to the disengaged structural arrangement; and (h) the cover lock is coupled to the cover and movable between an unlocked structural arrangement and a locked structural arrangement, wherein (i) in the unlocked structural arrangement the cover lock permits movement of the clamp lever cover from the secured structural arrangement into the unsecured structural arrangement and (ii) in the locked structural arrangement the cover lock prevents movement of the clamp lever cover from the secured structural arrangement into the unsecured structural arrangement.

Example 5

The apparatus of Example 4 wherein the rearward portion of the coupler is connected to the tongue of the trailer by (i) being integrally formed with the tongue of the trailer, (ii) by being welded onto the tongue of the trailer, or (iii) by being attached to the tongue of the trailer with one or more fasteners.

Example 6

The apparatus of any preceding Example wherein: (i) the clamp lever cover and the rearward portion of the coupler or the bracket are engaged by a longitudinal ridge protruding from the rearward portion of the coupler or the bracket that is received in a longitudinal slot in the clamp lever cover, which ridge has a dovetailed or T-shaped transverse cross-section; (ii) the ridge and slot are structurally arranged so as to permit longitudinal movement of the rearward portion of the coupler or the bracket relative to the engaged clamp lever cover between the secured and unsecured structural arrangements when the cover lock is in the unlocked structural arrangement; and (iii) the ridge and slot are structurally arranged so as to retain the clamp lever cover in the secured structural arrangement when the cover lock is in the locked structural arrangement.

Example 7

The apparatus of Example 6 wherein the ridge is (i) integrally formed with the rearward portion of the coupler, (ii) welded onto the rearward portion of the coupler, (iii) attached to the rearward portion of the coupler by one or more fasteners, (iv) attached to the bracket that is in turn attached to the rearward portion of the coupler, (v) integrally formed with the bracket, (vi) welded onto the bracket, or (vii) attached to the bracket by one or more fasteners.

Example 8

The apparatus of any one of Examples 6 or 7 wherein the ridge is attached to the rearward portion of the coupler and the rearward portion of the coupler is attached to the tongue of the trailer by one or more fasteners that extend at least partly through (i) the tongue, (ii) the rearward portion of the coupler, and (iii) a bracket attached to the ridge.

Example 9

The apparatus of any one of Examples 6-8 wherein one or both of the ridge and the slot are structurally arranged so as to prevent removal of the clamp lever cover from the bracket when the clamp lever cover is in the unsecured structural arrangement.

Example 10

The apparatus of any one of Examples 6-8 wherein one or both of the ridge and the slot are structurally arranged so that, in the unsecured structural arrangement, the clamp lever cover is removable from the bracket or from the rearward portion of the coupler.

Example 11

The apparatus of Example 10 further comprising a tether connecting the clamp lever cover to the bracket or to the coupler of the trailer.

Example 12

The apparatus of any one of Examples 6-11 wherein: (i) the cover lock includes a reciprocating rod coupled to the clamp lever cover and structurally arranged to be received, with the clamp lever cover in the secured structural arrangement, in a hole in the bracket or in the coupler of the trailer; (ii) with the cover lock in the unlocked structural arrangement, the rod is absent from the hole, thereby permitting relative longitudinal movement of the rearward portion or the bracket and the engaged clamp lever cover between the secured and unsecured structural arrangements; and (iii) with the clamp lever cover in the secured structural arrangement and the cover lock in the locked structural arrangement, the end of the rod is received within the hole, thereby retaining the clamp lever cover in the secured structural arrangement.

Example 13

The apparatus of any one of Examples 6-11 wherein: (i) the cover lock includes a rotating rod and transverse tab coupled to the clamp lever cover and structurally arranged for the tab to engage, with the clamp lever cover in the secured structural arrangement, a retainer on the bracket or on the coupler of the trailer; (ii) with the cover lock in the unlocked structural arrangement, the transverse tab does not engage the retainer, thereby permitting relative longitudinal movement of the bracket and the engaged clamp lever cover between the secured and unsecured structural arrangements; and (iii) with the clamp lever cover in the secured structural arrangement and the cover lock in the locked structural arrangement, the transverse tab engages the retainer, thereby retaining the clamp lever cover in the secured structural arrangement.

Example 14

The apparatus of any one of Examples 1-13 wherein (i) the clamp lever cover includes a back wall at least partly enclosing an interior volume of the clamp lever cover, (ii) the clamp lever cover includes an interior partition dividing a rearward portion of the interior volume from a forward portion of the interior volume, (iii) the cover lock includes an exterior portion outside the clamp lever cover and an interior portion within the rearward portion of the interior volume, (iv) in the secured structural arrangement, at least a portion of the clamp lever is received within the forward portion of the interior volume, and (v) in the secured structural arrangement, the clamp lever cover impedes or prevents access to the interior portion of the cover lock.

Example 15

The apparatus of any one of Examples 1-13 wherein: (i) the clamp lever cover includes a back wall at least partly enclosing an interior volume of the clamp lever cover; (ii) the bracket or the rearward portion of the coupler includes a partition positioned, in the secured structural arrangement, so as to divide a rearward portion of the interior volume of the clamp lever cover from a forward portion of the interior volume of the clamp lever cover; (iii) the cover lock includes an exterior portion outside the clamp lever cover and an interior portion within the rearward portion of the interior volume; (iv) in the secured structural arrangement, at least a portion of the clamp lever is received within the forward portion of the interior volume; and (v) in the secured structural arrangement, the clamp lever cover and the partition impede or prevent access to the interior portion of the cover lock.

It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

In the foregoing Detailed Description, various features may be grouped together in several exemplary embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed exemplary embodiment. Thus, the appended claims are hereby incorporated into the Detailed Description, with each claim standing on its own as a separate disclosed embodiment. However, the present disclosure shall also be construed as implicitly disclosing any embodiment having any suitable set of one or more disclosed or claimed features (i.e., sets of features that are not incompatible or mutually exclusive) that appear in the present disclosure or the appended claims, including those sets that may not be explicitly disclosed herein. It should be further noted that the scope of the appended claims does not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including," "having," and variants thereof, wherever they appear, shall be construed as open ended terminology, with the same meaning as if the phrase "at least" were appended after each instance thereof.

In the appended claims, if the provisions of 35 USC §112 (f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC §112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. A security device for a coupler for a trailer, which coupler comprises (i) a rearward portion connected to a tongue of the trailer, (ii) a forward portion that includes a socket structurally arranged for receiving a hitch ball, (iii) a ball clamp coupled to the forward portion and movable between a clamped structural arrangement and an unclamped structural arrangement, and (iv) a clamp lever coupled to the ball clamp and movable between an engaged structural arrangement and a disengaged structural arrangement, wherein (v) in the engaged structural arrangement the clamp lever holds the ball clamp in a clamped structural arrangement and in the disengaged structural arrangement the clamp lever permits movement of the ball clamp into an unclamped structural arrangement, and (vi) in the unclamped structural arrangement the ball clamp permits movement of a hitch ball into and out of the socket, in the clamped structural arrangement the ball clamp retains within the socket a hitch ball received within the socket and thereby prevents movement of the retained hitch ball out of the socket, and in the clamped structural arrangement the ball clamp prevents movement of a hitch ball into the socket, the security device comprising a bracket, a clamp lever cover, and a cover lock, wherein:

(a) the bracket is structurally arranged to be connected to the rearward portion of the coupler of the trailer;

(b) the clamp lever cover is engaged with the bracket and movable between a secured structural arrangement and an unsecured structural arrangement, wherein (i) in the secured structural arrangement the cover prevents movement of the clamp lever from the engaged structural arrangement to the disengaged structural arrangement and (ii) in the unsecured structural arrangement the cover permits movement of the clamp lever from the engaged structural arrangement to the disengaged structural arrangement;

(c) the cover lock is coupled to the clamp lever cover and movable between an unlocked structural arrangement and a locked structural arrangement, wherein (i) in the unlocked structural arrangement the cover lock permits movement of the clamp lever cover from the secured structural arrangement to the unsecured structural arrangement and (ii) in the locked structural arrangement the cover lock engages the bracket or the rearward portion so as to retain the clamp lever cover in the secured structural arrangement and prevent movement of the clamp lever cover from the secured structural arrangement into the unsecured structural arrangement;

(d) the clamp lever cover and the bracket are engaged by a longitudinal ridge protruding from the bracket that is received in a longitudinal slot in the clamp lever cover, which ridge has a dovetailed or T-shaped transverse cross-section;

(e) the ridge and slot are structurally arranged so as to permit relative longitudinal movement of the bracket and the engaged clamp lever cover between the secured and unsecured structural arrangements when the cover lock is in the unlocked structural arrangement; and (f) the ridge and slot are structurally arranged so as to retain the clamp lever cover in the secured structural arrangement when the cover lock is in the locked structural arrangement.

2. The apparatus of claim 1 wherein the bracket is structurally arranged to be attached to the rearward portion of the coupler by one or more fasteners that extend at least partly through the bracket and at least partly through the rearward portion of the coupler.

3. The apparatus of claim 1 wherein the bracket is structurally arranged to be attached to the rearward portion of the coupler by one or more fasteners that extend at least partly through (i) the bracket, (ii) the rearward portion of the coupler, and (iii) a tongue of a trailer, thereby securing the rearward portion of the coupler to the tongue of the trailer.

4. The apparatus of claim 1 wherein the ridge is (i) integrally formed with the bracket, (ii) welded onto the bracket, or (iii) attached to the bracket by one or more fasteners.

5. The apparatus of claim 1 wherein one or both of the ridge and the slot are structurally arranged so as to prevent removal of the clamp lever cover from the bracket when the clamp lever cover is in the unsecured structural arrangement.

6. The apparatus of claim 1 wherein one or both of the ridge and the slot are structurally arranged so that, in the unsecured structural arrangement, the clamp lever cover is removable from the bracket.

7. The apparatus of claim 6 further comprising a tether connecting the clamp lever cover to the bracket or to the coupler of the trailer.

8. The apparatus of claim 1 wherein: (i) the cover lock includes a reciprocating rod coupled to the clamp lever cover and structurally arranged to be received, with the clamp lever cover in the secured structural arrangement, in a hole in the bracket or in the coupler of the trailer; (ii) with the cover lock in the unlocked structural arrangement, the rod is absent from the hole, thereby permitting relative longitudinal movement of the bracket and the engaged clamp lever cover between the secured and unsecured structural arrangements; and (iii) with the clamp lever cover in the secured structural arrangement and the cover lock in the locked structural arrangement, the end of the rod is received within the hole, thereby retaining the clamp lever cover in the secured structural arrangement.

9. The apparatus of claim 1 wherein: (i) the cover lock includes a rotating rod and transverse tab coupled to the clamp lever cover and structurally arranged for the tab to engage, with the clamp lever cover in the secured structural arrangement, a retainer on the bracket or on the coupler of the trailer; (ii) with the cover lock in the unlocked structural arrangement, the transverse tab does not engage the retainer, thereby permitting relative longitudinal movement of the bracket and the engaged clamp lever cover between the secured and unsecured structural arrangements; and (iii) with the clamp lever cover in the secured structural arrangement and the cover lock in the locked structural arrangement, the transverse tab engages the retainer, thereby retaining the clamp lever cover in the secured structural arrangement.

10. The apparatus of claim 1 wherein: (i) the clamp lever cover includes a back wall at least partly enclosing an interior volume of the clamp lever cover; (ii) the clamp lever cover includes an interior partition dividing a rearward portion of the interior volume from a forward portion of the interior volume; (iii) the cover lock includes an exterior portion outside the clamp lever cover and an interior portion within the rearward portion of the interior volume; (iv) in the secured structural arrangement, at least a portion of the clamp lever is received within the forward portion of the interior volume; and (v) in the secured structural arrangement, the clamp lever cover impedes or prevents access to the interior portion of the cover lock.

11. The apparatus of claim 1 wherein: (i) the clamp lever cover includes a back wall at least partly enclosing an interior volume of the clamp lever cover; (ii) the bracket includes a partition positioned, in the secured structural arrangement, so as to divide a rearward portion of the interior volume of the clamp lever cover from a forward portion of the interior volume of the clamp lever cover; (iii) the cover lock includes an exterior portion outside the clamp lever cover and an interior portion within the rearward portion of the interior volume; (iv) in the secured structural arrangement, at least a portion of the clamp lever is received within the forward portion of the interior volume; and (v) in the secured structural arrangement, the clamp lever cover and the partition impede or prevent access to the interior portion of the cover lock.

12. An apparatus comprising a coupler for a trailer and a security device, wherein:
   (a) the coupler comprises a rearward portion, a forward portion, a ball clamp, and a clamp lever;
   (b) the security device comprises a clamp lever cover and a cover lock;
   (c) the rearward portion of the coupler is structurally arranged to be connected to a tongue of a trailer;
   (d) the forward portion of the coupler includes a socket structurally arranged for receiving a hitch ball;
   (e) the ball clamp is coupled to the forward portion of the coupler and movable between an unclamped structural arrangement and a clamped structural arrangement, wherein (i) in the unclamped structural arrangement the ball clamp permits movement of a hitch ball into and out of the socket, (ii) in the clamped structural arrangement the ball clamp retains within the socket a hitch ball received within the socket and thereby prevents movement of the retained hitch ball out of the socket, and (iii) in the clamped structural arrangement the ball clamp prevents movement of a hitch ball into the socket;
   (f) the clamp lever is coupled to the ball clamp and movable between an engaged structural arrangement and a disengaged structural arrangement, wherein (i) in the engaged structural arrangement the clamp lever holds the ball clamp in the clamped structural arrangement and (ii) in the disengaged structural arrangement the clamp lever permits movement of the ball clamp into the unclamped structural arrangement;
   (g) the clamp lever cover is engaged with the rearward portion and movable between a secured structural arrangement and an unsecured structural arrangement, wherein (i) in the secured structural arrangement the cover prevents movement of the clamp lever from the engaged structural arrangement to the disengaged structural arrangement and (ii) in the unsecured structural arrangement the cover permits movement of the clamp lever from the engaged structural arrangement to the disengaged structural arrangement;
   (h) the cover lock is coupled to the cover and movable between an unlocked structural arrangement and a locked structural arrangement, wherein (i) in the unlocked structural arrangement the cover lock permits movement of the clamp lever cover from the secured structural arrangement into the unsecured structural arrangement and (ii) in the locked structural arrangement the cover lock prevents movement of the clamp lever cover from the secured structural arrangement into the unsecured structural arrangement;
   (i) the clamp lever cover and the rearward portion of the coupler are engaged by a longitudinal ridge protruding from the rearward portion of the coupler that is received in a longitudinal slot in the clamp lever cover, which ridge has a dovetailed or T-shaped transverse cross-section;

(j) the ridge and slot are structurally arranged so as to permit relative longitudinal movement of the rearward portion and the engaged clamp lever cover between the secured and unsecured structural arrangements when the cover lock is in the unlocked structural arrangement; and (k) the ridge and slot are structurally arranged so as to retain the clamp lever cover in the secured structural arrangement when the cover lock is in the locked structural arrangement.

13. The apparatus of claim 12 wherein the rearward portion of the coupler is connected to the tongue of the trailer by (i) being integrally formed with the tongue of the trailer, (ii) by being welded onto the tongue of the trailer, or (iii) by being attached to the tongue of the trailer with one or more fasteners.

14. The apparatus of claim 12 wherein the ridge is (i) integrally formed with the rearward portion of the coupler, (ii) welded onto the rearward portion of the coupler, (iii) attached to the rearward portion of the coupler by one or more fasteners, or (iv) attached to a bracket that is in turn attached to the rearward portion of the coupler.

15. The apparatus of claim 12 wherein the ridge is attached to the rearward portion of the coupler by one or more fasteners that extend at least partly through (i) the rearward portion of the coupler and (ii) a bracket attached to the ridge.

16. The apparatus of claim 12 wherein the ridge is attached to the rearward portion of the coupler and the rearward portion of the coupler is attached to the tongue of the trailer by one or more fasteners that extend at least partly through (i) the tongue, (ii) the rearward portion of the coupler, and (iii) a bracket attached to the ridge.

17. The apparatus of claim 12 wherein one or both of the ridge and the slot are structurally arranged so as to prevent removal of the clamp lever cover from the rearward portion of the coupler when the clamp lever cover is in the unsecured structural arrangement.

18. The apparatus of claim 12 wherein one or both of the ridge and the slot are structurally arranged so that, in the unsecured structural arrangement, the clamp lever cover is removable from the rearward portion of the coupler.

19. The apparatus of claim 18 further comprising a tether connecting the clamp lever cover to the coupler of the trailer.

20. The apparatus of claim 12 wherein: (i) the cover lock includes a reciprocating rod coupled to the clamp lever cover and structurally arranged to be received, with the clamp lever cover in the secured structural arrangement, in a hole in the coupler of the trailer or in a bracket on the coupler of the trailer; (ii) with the cover lock in the unlocked structural arrangement, the rod is absent from the hole, thereby permitting relative longitudinal movement of the coupler and the engaged clamp lever cover between the secured and unsecured structural arrangements; and (iii) with the clamp lever cover in the secured structural arrangement and the cover lock in the locked structural arrangement, the end of the rod is received within the hole, thereby retaining the clamp lever cover in the secured structural arrangement.

21. The apparatus of claim 12 wherein: (i) the cover lock includes a rotating rod and transverse tab coupled to the clamp lever cover and structurally arranged for the tab to engage, with the clamp lever cover in the secured structural arrangement, a retainer on the coupler of the trailer; (ii) with the cover lock in the unlocked structural arrangement, the transverse tab does not engage the retainer, thereby permitting relative longitudinal movement of the coupler and the engaged clamp lever cover between the secured and unsecured structural arrangements; and (iii) with the clamp lever cover in the secured structural arrangement and the cover lock in the locked structural arrangement, the transverse tab engages the retainer, thereby retaining the clamp lever cover in the secured structural arrangement.

22. The apparatus of claim 12 wherein (i) the clamp lever cover includes a back wall at least partly enclosing an interior volume of the clamp lever cover, (ii) the clamp lever cover includes an interior partition dividing a rearward portion of the interior volume from a forward portion of the interior volume, (iii) the cover lock includes an exterior portion outside the clamp lever cover and an interior portion within the rearward portion of the interior volume, (iv) in the secured structural arrangement, at least a portion of the clamp lever is received within the forward portion of the interior volume, and (v) in the secured structural arrangement, the clamp lever cover impedes or prevents access to the interior portion of the cover lock.

23. The apparatus of claim 12 wherein: (i) the clamp lever cover includes a back wall at least partly enclosing an interior volume of the clamp lever cover; (ii) the rearward portion of the coupler includes a partition positioned, in the secured structural arrangement, so as to divide a rearward portion of the interior volume of the clamp lever cover from a forward portion of the interior volume of the clamp lever cover; (iii) the cover lock includes an exterior portion outside the clamp lever cover and an interior portion within the rearward portion of the interior volume; (iv) in the secured structural arrangement, at least a portion of the clamp lever is received within the forward portion of the interior volume; and (v) in the secured structural arrangement, the clamp lever cover and the partition impede or prevent access to the interior portion of the cover lock.

* * * * *